US009665791B2

(12) United States Patent
Straub et al.

(10) Patent No.: US 9,665,791 B2
(45) Date of Patent: May 30, 2017

(54) SYSTEM AND METHOD FOR EXTRACTING DOMINANT ORIENTATIONS FROM A SCENE

(71) Applicant: Massachusetts Institute Of Technology, Cambridge, MA (US)

(72) Inventors: Julian Straub, Cambridge, MA (US); Guy Rosman, Cambridge, MA (US); Oren Freifeld, Cambridge, MA (US); John J. Leonard, Newton, MA (US); John W. Fisher, III, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 20 days.

(21) Appl. No.: 14/678,585

(22) Filed: Apr. 3, 2015

(65) Prior Publication Data
US 2015/0286893 A1    Oct. 8, 2015

Related U.S. Application Data

(60) Provisional application No. 61/975,074, filed on Apr. 4, 2014.

(51) Int. Cl.
*G06K 9/36* (2006.01)
*G06K 9/52* (2006.01)
(Continued)

(52) U.S. Cl.
CPC .......... *G06K 9/52* (2013.01); *G06K 9/00637* (2013.01); *G06K 9/00664* (2013.01);
(Continued)

(58) Field of Classification Search
CPC .... G06K 9/52; G06K 9/3275; G06K 9/00637; G06K 9/00664; G06T 7/0048;
(Continued)

(56) References Cited

U.S. PATENT DOCUMENTS 6,208,763 B1 * 3/2001 Avinash ............... G06T 5/002
                                                          382/172
7,333,111 B2    2/2008 Ng-Thow-Hing et al.
(Continued)

OTHER PUBLICATIONS

Hinterstoisser et al, Dominant Orientation Templates for Real-Time Detection of Texture-less Objects, 2010.*
(Continued)

*Primary Examiner* — John Strege
(74) *Attorney, Agent, or Firm* — Nield, Lemack & Frame, LLC

(57) ABSTRACT

In one embodiment, a method of identifying the dominant orientations of a scene comprises representing a scene as a plurality of directional vectors. The scene may comprise a three-dimensional representation of a scene, and the plurality of directional vectors may comprise a plurality of surface normals. The method further comprises determining, based on the plurality of directional vectors, a plurality of orientations describing the scene. The determined plurality of orientations explains the directionality of the plurality of directional vectors. In certain embodiments, the plurality of orientations may have independent axes of rotation. The plurality of orientations may be determined by representing the plurality of directional vectors as lying on a mathematical representation of a sphere, and inferring the parameters of a statistical model to adapt the plurality of orientations to explain the positioning of the plurality of directional vectors lying on the mathematical representation of the sphere.

19 Claims, 13 Drawing Sheets
(8 of 13 Drawing Sheet(s) Filed in Color)

(51) Int. Cl.
*G06T 15/10* (2011.01)
*G06T 7/00* (2017.01)
*G06K 9/00* (2006.01)
*G06K 9/32* (2006.01)
*G06T 7/77* (2017.01)

(52) U.S. Cl.
CPC ............... *G06K 9/3275* (2013.01); *G06T 7/00* (2013.01); *G06T 7/77* (2017.01); *G06T 15/10* (2013.01); *G06T 2207/10024* (2013.01); *G06T 2207/10028* (2013.01); *G06T 2207/20076* (2013.01)

(58) Field of Classification Search
CPC . G06T 7/00; G06T 15/10; G06T 2207/10028; G06T 2207/10024; G06T 2207/20076
USPC ........................................................ 382/154
See application file for complete search history.

(56) References Cited

U.S. PATENT DOCUMENTS

| | | | | |
|---|---|---|---|---|
| 8,217,938 | B2* | 7/2012 | Chen | G06T 7/0042 345/419 |
| 8,606,774 | B1* | 12/2013 | Makadia | G06F 17/30 345/653 |
| 2013/0250050 | A1 | 9/2013 | Kanaujia et al. | |

OTHER PUBLICATIONS

Qian, et al. Discriminitive histograms of local dominatn orientation for biometric image feature extraction, 2013, pattern recognition.*

International Search Report and Written Opinion mailed Jul. 14, 2015 in corresponding PCT application No. PCT/US15/24311.

2013 IEEE Conference on Computer Vision and Pattern Recognition, 2013 IEEE, pp. 1336-1343, "A Global Approach for the Detection of Vanishing Points and Mutually Orthogonal Vanishing Directions", Antunes, et al.

The Visual Computer, Special Issue on Computational Video, vol. 19, No. 6, Oct. 2003, pp. 417-430, "Vanishing points and three-dimensional lines from omni-directional video", Bosse, et al.

Proceedings of the International Conference on Computer Vision, ICCV '99, Corfu, Greece, 1999, pp. 1-10, "Manhattan World: Compass Direction from a Single Image by Bayesian Inference", Coughlan, et al.

Proceedings of the 2009 International Conference on Computer Vision, ICCV 2009, pp. 1-8, "Reconstructing Building Interiors from Images", Furukawa, et al.

LIRIS (Laboratoire d'InfoRmatique en Image et Systemes d'information) 5954, liris.cnrs.fr/natalia.neverova/npapers/Liris-5954, Mar. 2013, pp. 1-15, "2 1/2 D Scene Reconstruction of Indoor Scenes from Single RGB-D Images", Neverova, et al.

Proceedings of the 2004 IEEE Computer Society Conference on Computer Vision and Pattern Recognition, CVPR 2004, vol. 1, pp. 203-209, "Atlanta World: An Expectation Maximization Framework for Simultaneous Low-level Edge Grouping and Camera Calibration in Complex Man-made Environments", 7 pages, Schindler, et al.

Proceedings of the 2014 IEEE Conference on Computer Vision and Pattern Recognition (CVPR 2014), Jun. 2014, pp. 1-8, "A Mixture of Manhattan Frames: Beyond the Manhattan World", Straub, et al.

Proceedings of the 2014 IEEE Conference on Computer Vision and Pattern Recognition (CVPR 2014), Jun. 2014, pp. 1-2, "A Mixture of Manhattan Frames: Beyond the Manhattan World (Extended Abstract)", Straub, et al.

Proceedings of the 2014 IEEE Conference on Computer Vision and Pattern Recognition (CVPR 2014), Jun. 2014, pp. 1-7, "Supplemental Material; A Mixture of Manhattan Frames: Beyond the Manhattan World", Straub, et al.

A Mixture of Manhattan Frames: Beyond the Manhattan World, Slide presentation, Oct. 5, 2014, 52 pages, Straub, et al.

Proceedings of the 2015 IEEE Conference on Computer Vision and Pattern Recognition (CVPR 2015), Jun. 2015, pp. 334-342, "Small-Variance Nonparametric Clustering on the Hypersphere", 9 pages, Straub, et al.

Proceedings of the Eighteenth International Conference on Artificial Intelligence and Statistics, (AISTATS 2015), Jan. 2015, pp. 930-938, "A Dirichlet Process Mixture Model for Spherical Data", Straub, et al.

IROS (International Conference on Intelligent Robots and Systems) 2015, Jul. 2015, 8 pages, "Real-time Manhattan World Rotation Estimation in 3D", Straub, et al.

Proceedings of IEEE International Conference on Robotics & Automation (ICRA), 2005, pp. 1-6, "Using Hierarchical EM to Extract Planes from 3D Range Scans", Triebel, et al.

* cited by examiner

402

414

412

424

422

SYSTEM AND METHOD FOR EXTRACTING DOMINANT ORIENTATIONS FROM A SCENE

CROSS-REFERENCE TO RELATED APPLICATIONS

The present application claims priority to U.S. Provisional Patent Application Ser. No. 61/975,074 for "Method to Extract Dominant Orientations Within a Scene From Depth Images and Point Clouds", filed Apr. 4, 2014, the disclosure of which is incorporated herein by reference.

STATEMENT REGARDING FEDERALLY FUNDED RESEARCH

This invention was made with government support under Contract No. FA8650-11-1-7154 awarded by the Department of Energy under Grant No. DE-FC02-99ER54512. The government has certain rights in the invention.

FIELD OF THE DISCLOSURE

The present disclosure generally relates to the field of three-dimensional scene representation. In particular, the present disclosure relates to systems and methods for identifying a plurality of orientations within a three-dimensional scene.

BACKGROUND

Simplifying assumptions about the structure of surroundings facilitates reasoning about complex environments. On a wide range of scales, from the layout of a city to structures such as buildings, furniture, and many other objects, man-made structures lend themselves to a description in terms of parallel and orthogonal planes. This intuition is formalized as the Manhattan World (MW) assumption, which posits that most man-made structures may be approximated by planar surfaces that are parallel to one of the three principal planes of a common orthogonal coordinate system.

The MW assumption has been used to estimate orientations within man-made environments for the visually impaired and for robots. In the application of Simultaneous Localization and Mapping (SLAM), the MW assumption has been used to impose constraints on the inferred map. At a coarse level, the Manhattan World assumption holds for city layouts, most buildings, hallways, offices, and other man-made environments. However, the strict Manhattan World assumption cannot represent many real-world scenes, such as a rotated desk, a half-opened door, and complex city layouts (in contrast to planned cities, such as Manhattan).

A popular alternative to the MW model describes man-made structures by individual planes with no constraints on their relative normal directions. Such plane-based representations of 3D scenes have been used in scene segmentation, localization, optical flow, as well as other computer-vision applications. For example, the main direction of planes in a scene can be extracted using a hierarchical Expectation-Maximization (EM) approach. Using the Bayesian Information Criterion (BIC), the number of main directions can be inferred. However, plane-based approaches do not exploit the orthogonal relationships between planes that are common in man-made structures. In such cases, independent location and orientation estimates of planes will be less robust, especially for planes that have few measurements or are subject to increased noise.

Another alternative to the MW model is the Atlanta World (AW). The AW model assumes that the world is composed of multiple Manhattan Worlds sharing the same z-axis. This facilitates inference from RGB images, as only a single angle per Manhattan World needs to be estimated, as opposed to a full 3D rotation. However, common indoor scenes break the AW assumption, because these scenes typically contain orientations that do not share the same z-axis.

Accordingly, there is a need for an improved method and system for describing scenes that can accommodate multiple orientations, yet does not suffer from the limitations described for the above approaches.

SUMMARY

The present disclosure features a novel approach for identifying the dominant orientations of a scene. The present disclosure results, in one example, from the realization that a plurality of directional vectors representing a scene may be used to identify a plurality of orientations within the scene. In certain embodiments, a plurality of directional vectors, such as surface normals, representing a scene may be represented on a sphere. Each identified orientation corresponds to a set of orthogonally-coupled clusters of the directional vectors. In certain embodiments, each orientation may be referred to as a Manhattan Frame (MF) within the scene. The Manhattan Frame may be used to incorporate the geometric and manifold properties of rotations into a probabilistic model suitable for inference. As a scene may comprise a plurality of MFs, this model may be referred to as a Mixture of Manhattan Frames (MMF).

Certain embodiments use a probabilistic Bayesian model for the MMF, which may be inferred using a Gibbs sampling-based inference algorithm. Using Metropolis-Hastings split/merge proposals, the inference algorithm adapts the number of MFs to that of the distribution of surface normals in the scene. Additionally, an approximation to the posterior distribution over MF rotations may be used that utilizes a gradient-based optimization of a robust cost function which exploits the geometry of both the unit sphere as well as the group of rotation matrices SO(3). Further embodiments demonstrate the versatility of the MMF model, as it can describe complex scenes using data extracted from various sources, such as depth images of indoor scenes, as well as large scale aerial LIDAR measurements of an urban center. The advantages of the model are evident in several applications, including focal-length calibration of depth cameras, plane segmentation, and robotic navigation.

In one embodiment, a method and system of identifying the dominant orientations from a scene comprises representing, by an orientation agent executing on a processor, a scene as a plurality of directional vectors. The orientation agent may then determine, based on the plurality of directional vectors, a plurality of orientations describing the scene. The determined plurality of orientations explains the directionality of the plurality of directional vectors. In certain embodiments, the plurality of orientations may have independent axes of rotation relative to one another. In certain embodiments, the scene may comprise a three-dimensional representation of a scene. In certain embodiments, the plurality of orientations may comprise a set of orthogonally coupled axes, which explain the directionality of the directional vectors. In certain embodiments, the plurality of directional vectors may comprise a plurality of surface normals, such that determining a plurality of orientations comprises determining a plurality of orientations that explains the directionality of the plurality of surface normals.

In an additional embodiment, the method and system can comprise receiving a representation of a scene, extracting a plurality of surface normals from the representation of the scene, and representing the plurality of surface normals as points lying on a mathematical representation of a sphere. In certain embodiments, the sphere may be a unit sphere. In certain embodiments, determining a plurality of orientations comprises determining a plurality of orientations that explains the positioning of the plurality of surface normals lying on the mathematical representation of the sphere.

In an additional embodiment, the method and system can comprise adapting a plurality of orientations to explain the positioning of surface normals lying on a mathematical representation of a sphere. In certain embodiments, adapting the plurality of orientations comprises initializing a statistical model describing the positioning of the surface normals lying on the mathematical representation of the sphere and the plurality of orientations, and determining a plurality of orientations comprises inferring the parameters of the statistical model. In certain embodiments, the statistical model may be a Bayesian model or a deterministic model.

In an additional embodiment, inferring the parameters of the statistical model comprises determining the rotation of each orientation within the mathematical representation of the sphere, and determining the assignment of surface normals to an axis of an orientation. In certain embodiments, inferring the parameters of the statistical model comprises mapping each normal of the plurality of normals to a plane tangent to an associated axis of an associated orientation to the normal. In certain embodiments, the method and system further comprise determining whether a surface normal belongs to the associated axis of the associated orientation based on the surface normal's position on the tangent plane.

In an additional embodiment, each surface normal may be modeled on the tangent space as part of a Gaussian distribution. In certain embodiments, the system and method further comprise optimizing the rotation of an orientation based on the position of a plurality of associated normals on the tangent plane.

In an additional embodiment, the scene may be selected from the group consisting of a depth image, stereo vision, a virtual scene, and LiDAR measurements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1 through 13, wherein like parts are designated by like reference numerals throughout, illustrate an example embodiment of a system and method for the implementation of an orientation extraction system. Although the present disclosure describes the system and method with reference to the example embodiments described in the figures, it should be understood that many alternative forms can embody the present disclosure. One of ordinary skill in the art will additionally appreciate different ways to alter the parameters of the embodiments disclosed in a manner still in keeping with the spirit and scope of the present disclosure.

FIG. 1 is a block diagram illustrating an embodiment of an orientation extracting system according to the disclosure;

FIG. 2 is a block diagram illustrating the Manhattan Frame extraction engine of FIG. 1 in further detail;

FIG. 6 depicts a representation of a unit sphere and a Manhattan Frame;

FIG. 7 depicts a representation of a unit sphere and a Manhattan Frame, and a tangent space positioned tangent to an axis of the Manhattan Frame;

FIG. 8 is a schematic diagram illustrating an embodiment of a Mixture of Manhattan Frames (MMF) model according to the disclosure;

FIG. 9 is a flow diagram illustrating an embodiment of inferring the parameters of the MMF model of FIG. 8;

FIG. 10 depicts the three Manhattan Frames identified from the representation of the scene of FIG. 3; and FIG. 11 is a table illustrating the application of the MMF algorithm to a plurality of scenes, of which the scenes in columns (b), (e), and (f) were selected from the NYU V2 depth dataset;

DETAILED DESCRIPTION OF THE DISCLOSURE

Embodiments of the disclosure describe a novel model for scene representation that describes a scene as a mixture of orthogonally-coupled clusters on a representation of a sphere. In certain embodiments, this model may be referred to as a Mixture of Manhattan Frames (MMF). While parts of a scene may be modeled as a Manhattan World, others may not. This suggests a more flexible description of a scene as a MMF. Each Manhattan Frame within the scene defines a Manhattan World of a specific orientation. This results in a highly expressive model that that still exploits the constraints associated with orthogonal coordinate systems.

Further, the detailed description set forth below in connection with the appended drawings is intended as a description of embodiments and does not represent the only forms which may be constructed and/or utilized. However, it is to be understood that the same or equivalent functions and sequences may be accomplished by different embodiments that are also intended to be encompassed within the spirit and scope of the disclosure.

I. Orientation Extraction System

Figure 1:
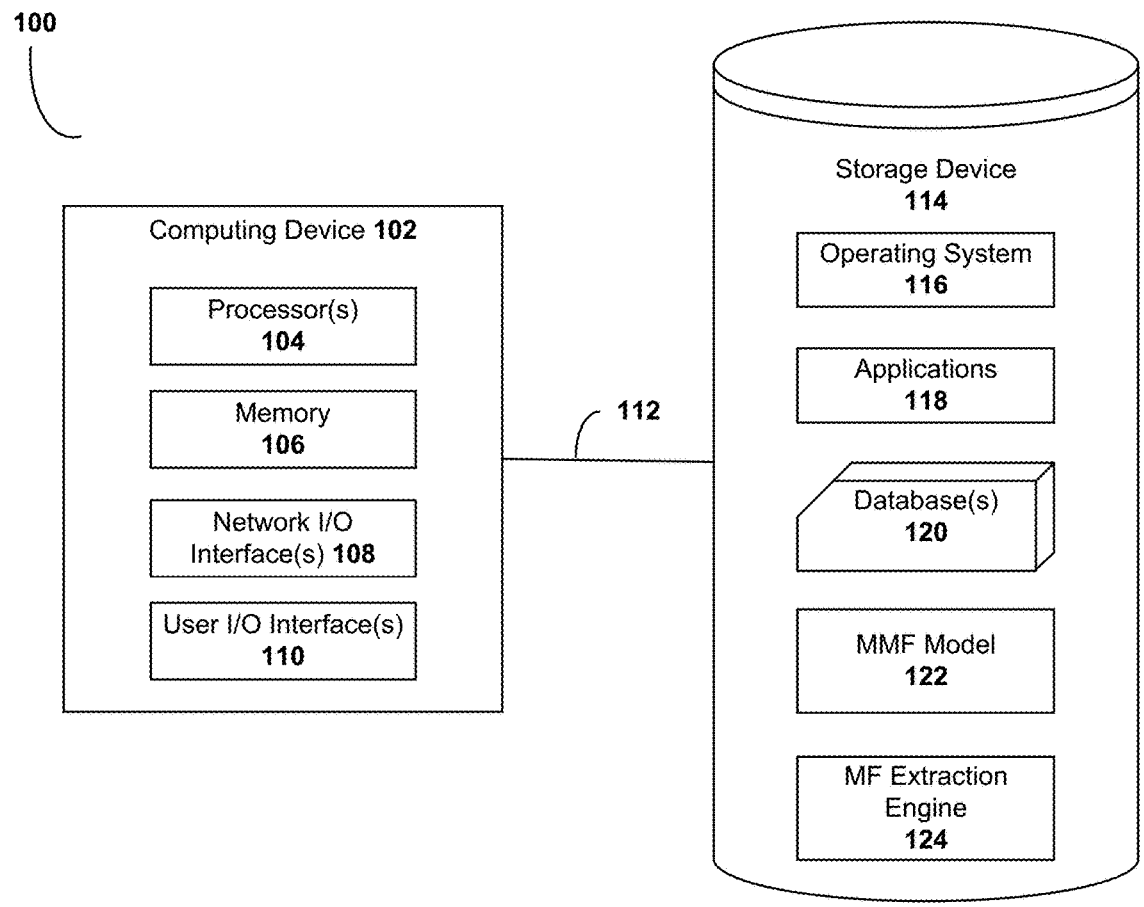

FIG. 1 is a block diagram illustrating an embodiment of an orientation extraction system 100 suitable for practicing exemplary embodiments of the present disclosure. The orientation extraction system 100 may be used for extracting directional vectors, such as surface normals, from scenes; representing surface normals on a mathematical representation of a sphere; and identifying the dominant orientations of the scene based on the positioning of surface normals on the sphere.

In this embodiment, the orientation extraction system 100 comprises a computing device 102, which may include processor(s) 104, memory 106, network input/output (I/O) interfaces 108, and user I/O interfaces 110. The orientation extraction system 100 may further comprise a storage device 114, such as a hard drive, flash drive, CD-ROM, or DVD, for storing an operating system 116 and other software programs. These software programs can include applications 118, which may further comprise a Manhattan Frame extraction engine 124. The storage device 114 may also store information related to scenes, directional vectors, surface normals, orientations, Manhattan Frames, and other data or information associated with the orientation extraction system 100, some of which may be stored within database(s) 120. Finally, the storage device 114 may store a Mixture of Manhattan Frames (MMF) Model 122, which may be utilized by the MF extraction engine 124 to identify a plurality of orientations associated with a scene. The storage device 114 may be connected to the computing device 102 by a communications link 112.

Depending on particular implementation requirements of the present disclosure, the computing device 102 may be any type of computing system, such as a workstation, server, desktop computer, laptop, handheld computer, cell phone, mobile device, tablet device, personal digital assistant, networked game or media console, or any other form of computing device or system. In certain embodiments, the computing device 102 may also include hardware for capturing three-dimensional information for a scene. For example, the computing device 102 may be a digital camera with a depth sensor, three-dimensional image capturing hardware, a LIDAR acquisition device, a robotic navigation system, a stereo camera system, and the like. Further embodiments of the computing device 102 may be wearable, e.g., as a component of a wearable pair glasses having image sensors and corresponding hardware, or as a component of an article of clothing.

Further, the computing device 102 may have sufficient processing power and memory capacity to perform all or part of the operations described herein. Alternately, all or parts of the computing device 102 may serve as a proxy, with some or all functions performed externally by a computer or other computing device. The computing device 102 may be embodied as a stand-alone system, or as a component of a larger electronic system within any kind of environment, such as within a photographic studio, vehicle, airplane, satellite, and the like. In certain embodiments, the orientation extraction system 100 may comprise multiples of computing devices 102, which may be differently configured.

The processors 104 may include hardware or software based logic to execute instructions on behalf of the computing device 102. For example, depending on specific implementation requirements, the processors 104 may include a microprocessor; single or multiple cores for executing software stored in the memory 106; or other hardware or software components for controlling the computing device 102. The processor 104 may be in communication with other components of the orientation extraction system 100, such as the memory 106, network I/O interfaces 108, user I/O interfaces 110, and storage device 114, for example, via a local bus.

The computing device 102 may access an external network or other computing devices via one or more network I/O interfaces 108. The network I/O interfaces 108 allows the computing device 102 to communicate with other computers or devices, and may comprise either hardware or software interfaces between equipment or protocol layers within a network. For example, the network I/O interfaces 108 may comprise Ethernet interfaces, frame relay interfaces, cable interfaces, DSL interfaces, token ring interfaces, wireless interfaces, cellular interfaces, serial interfaces fiber optic interfaces, and the like. Further, the computing device 102 may use the network I/O interfaces 108 to access various external data sources or services, or to provide access to data or information generated by the computing device 102 to various client devices.

End users may interact with the computing device 102 and orientation extraction system 100 via one or more user I/O interfaces 110. The user I/O interfaces 110 may comprise any combination of input or output devices that allow an end user to interact with the computing device 102. For example, input devices may comprise a keyboard, touchscreen, microphone, camera, mouse, touchpad, trackball, five-way switch, joystick, and/or any combination thereof. Output devices may comprise a screen, speaker, printer, and/or any combination thereof. Thus, an end user may interact with the computing device 102 by speaking, tapping, gesturing, typing, or using a combination of multiple input modes. In turn, the computing device 102 or other component may respond with any combination of visual, aural, or haptic output. The computing device 102 may manage the user I/O interfaces 110 and provide a user interface to the end user by executing a stand-alone application (e.g., one of the applications 118) residing in the storage device 114 which has been loaded into the memory 106. Alternately, a user interface may be provided by an operating system 116 executing on the computing device 102.

The storage device 114 may be any form of storage, such as a hard disk, sold state drive, flash drive, DVD, CD-ROM, or cloud-based storage. The computing device 102 may access the storage device 114 via the communications link 112, which may comprise any form of electrical communication, including TCP/IP over a LAN or WAN network, or a direct connection such as USB or SATA. The communications link 112 may also simply be a local bus through which various components of the computing device 102 communicate. Accordingly, in certain embodiments, the computing device 102 and storage device 114 are housed within the same enclosure. However, in other embodiments, the computing device 102 and storage device 114 may be housed separately. In certain embodiments, several storage devices 114 may be used by the orientation extraction system 100. For example, various components of the storage device 114 may be distributed or duplicated between a local storage device residing on the computing device 102, and an external storage device accesses via a network or other communication means.

The applications 118 and MF extraction engine 124 may run on the operating system 116. The operating system 116 may comprise any of the versions of the conventional operating systems, any embedded operating system, any real-time operating system, any open source operating system, any proprietary operating system, or any other operating system capable of running on the computing device 102 and performing all or part of the operations described herein. Further, the operating system 116, applications 118, and MF extraction engine 124 may in some instances be accessed or run from a bootable CD, thumb drive, or from a network.

Applications 118 may comprise any kind of application, and may communicate and exchange data with other applications executing on the computing device 102. Applications may include applications related to various aspects of identifying the dominant orientation of a scene, for interacting with the computing device 102, for exchanging information with other components of the system, or for any other purpose.

As previously noted, the storage device 114 may also store information related to scenes, directional vectors, surface normals, orientations, and Manhattan Frames. However, in certain embodiments, portions of the storage device 114 and orientation extraction system 100 may also store various other kinds of information related to identifying orientations within a scene. For example, the storage device 114 may include information related to three dimensional depth data, photographs, a collection of scenes, LIDAR data, point clouds, triangle meshes, plane-based representations, and the like. Information may be stored and organized in any manner or format. For example, information may be stored within databases 120, such as a relational database and organized by tables, or alternately stored as a simple flat file.

The MMF model 122 may comprise a statistical model housing a plurality of parameters related to the plurality of orientations associated with a scene. The MF extraction engine 124 may comprise a library of logical and statistical code that, when loaded into memory 106 and executed by processor 104, identifies a set of orientations within a scene. The library may receive, for example, information regarding a scene, including surface normals, surface normals represented on a sphere, and information related to other parameters of the MMF model 122. As will be described in further detail below, the MF extraction engine 124 may retrieve the MMF model 122 and other parameters or variables from the library or other source and an estimate of the current parameters of the model 122 may then be adjusted iteratively, creating a posterior estimate from a posterior distribution. Appropriate libraries may use an open implementation protocol that supports many different paradigms including, without limitation, Bayesian models, machine learning algorithms, likelihood-based algorithms, neural network algorithms, and the like. The MF extraction engine 124 may execute entirely on the computing device 102, or alternately may execute at least partly on external computing devices or systems. For example, in certain embodiments, portions of the MF Extraction Engine 124 may execute on a separate computing device 102.

Figure 2:
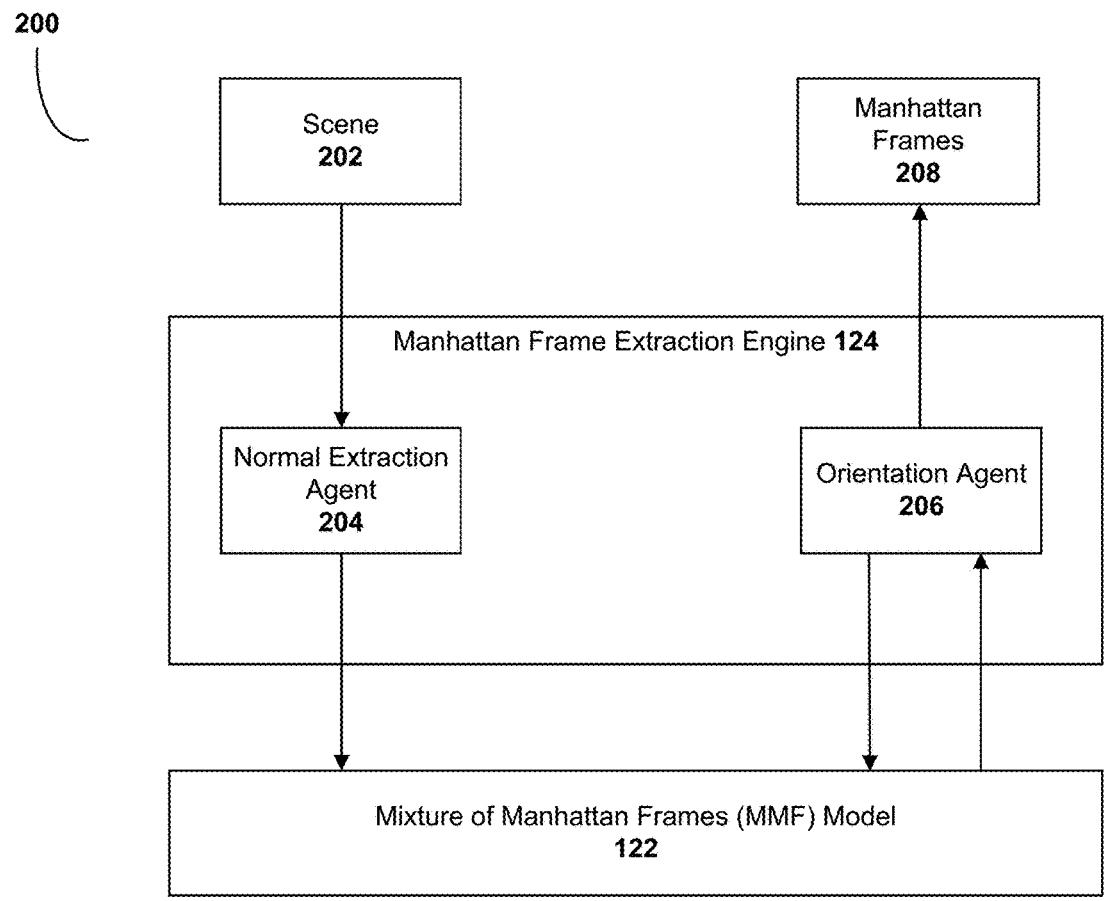

FIG. 2 illustrates the Manhattan Frame extraction engine 124 of FIG. 1 in further detail. In this embodiment, the MF extraction engine 124 comprises a normal extraction agent 204 and an orientation agent 206. The normal extraction agent 204 receives information about a scene 202 and interacts with the MMF Model 122. The orientation agent 206 interacts with the MMF Model 122 and subsequently outputs a set of Manhattan Frames 208. The set of Manhattan Frames 208 provide a dominant set of orientations for the scene 202.

Scenes 202 can comprise any representation of a scene. Scenes may represent views of physical structures ranging from the small to the very large, such as views of an interior office, a hallway, or the layout of a city. Scenes may also represent views of virtual structures, such as structures that exist only in the memory of a computer. For example, scenes can comprise a three-dimensional landscape in a video game. While the present disclosure generally refers to scenes as three-dimensional representations, scenes may also comprise representations of varying dimensions, such as 2-dimensional and 4-dimensional scenes. In certain embodiments, 4-dimensional scenes may also include time as a component, such that portions of the scene may change over time. For example, a 4-dimensional scene may comprise a stream of images or depth images, a stream of aerial LiDAR measurements, and the like.

Scenes 202 may be represented in a variety of ways. For example, a scene may be captured as a depth image. Depth images typically include parameters representing the distance from an object within the scene to the camera which captured the image. For example, RGB-D format images include an additional depth (-D) value for each pixel. Depth images may be generated from various sources or sensors. Particular hardware examples suitable for capturing depth images or for acquiring information about depth include an ASUS Xtion PRO Camera, a Microsoft Kinect device, stereo camera systems and the like. Using the depth parameters from the depth image, a three-dimensional representation of the scene can be computed. Scenes may also be represented as point clouds. For example, aerial LiDAR measurements can provide a point cloud of a city layout. Similarly, scenes may comprise or be represented by triangle meshes, plane-based representations, implicit level-set representations of a surface, and the like.

The normal extraction agent 204 is configured to receive information about the scene 202, such as depth information or point cloud information, and to then extract a set of surface normals from the scene. For purposes of the disclosure, the term "surface normal" may refer to directional vectors of unit length which are orthogonal to a plane or surface of any point within a scene. Surface normal extraction has become an integral aspect of 3D point set descriptions, and has many uses in 3D processing pipelines, such as surface fairing and reconstruction (e.g., Johnson and Hebert, "Surface registration by matching oriented points", 3*DIM*, pp. 121-128, 1997; Kazhdan, "Reconstruction of solid models from oriented point sets", *SGP*, p. 73, 2005). While this embodiment describes the agent 204 as extracting surface normals from a scene 202, in certain embodiments the agent 204 may simply extract a plurality of directional vectors from a scene. Further, in other embodiments, the agent 204 may extract other forms of directional information from the scene 202.

As the surface normals may be of unit length, they may subsequently be represented as points lying on a unit sphere. However, in certain embodiments, surface normals may comprise different lengths, and accordingly may be positioned on spheres having a radius other than unit length. As will be described in further detail below, an MMF model 122 according to the disclosure may rely on the structured and concentrated pattern of surface normals of the scene. Accordingly, an accurate and robust estimation of normals helps to optimize the MMF model 122.

The orientation agent 206 is configured to interact with the MMF model 122 to determine an optimal set of Manhattan Frames 208 that best explains the positioning of surface normals from the scene 202 on a mathematical representation of a sphere. In this embodiment, each Manhattan Frame comprises an independent orientation within the scene 202 that explains the positioning of an orthogonally-coupled set of surface normals on a mathematical representation of a sphere. However, in certain embodiments, the orientation agent 206 may identify a set of orientations that explain the position of a plurality of directional vectors in other ways.

While in this embodiment, the Manhattan Frame extraction engine 124 comprises both the normal extraction agent 204 and orientation agent 206, in certain embodiments either agent may be omitted. For example, in certain embodiments the orientation agent 206 may be configured to receive a set of surface normals from an exterior source. Both the normal extraction agent 204 and orientation agent 206 may be configured to operate in real-time, or to identify both normals and Manhattan Frames on-demand.

Figure 3A:
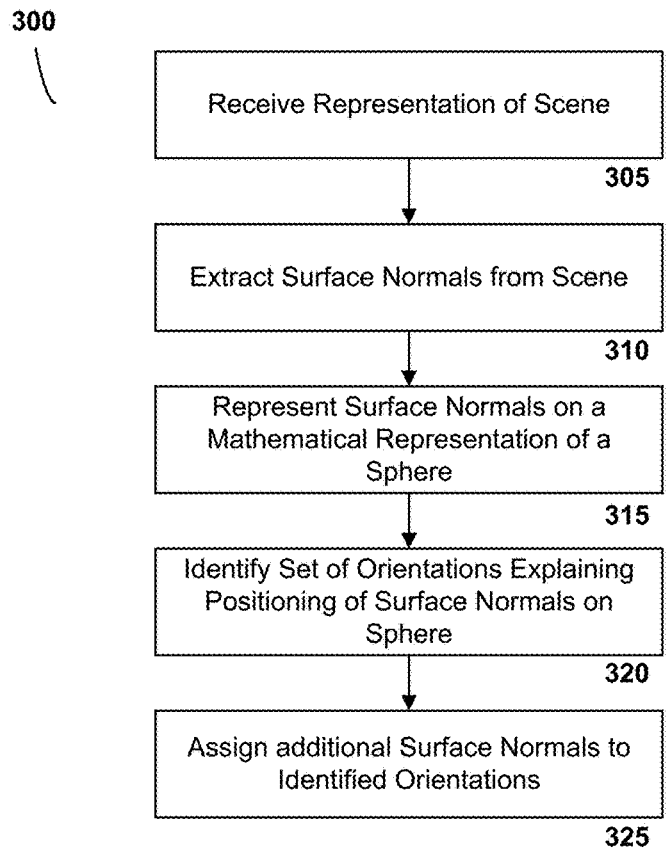
FIGS. 3A-B are flow diagrams illustrating an embodiment of a method of identifying a plurality of orientations for a scene.

FIG. 3A is a flow diagram illustrating an exemplary embodiment of a method 300 of identifying a plurality of orientations for a scene. The method 300 may be performed in the context of an orientation extraction system 100, and practiced at least in part by a normal extraction agent 204 and orientation agent 206 according to the disclosure, for example. Based on a representation of a scene, the method 300 identifies a set of orientations, such as Manhattan Frames, that best fit the representation. The method 300 may begin by receiving (e.g., by a normal extraction agent 204) a representation of a scene (step 305). The normal extraction agent 204 may then extract a set of surface normals from the representation of the 3D scene (step 310). The surface normals may be of unit length, facilitating their representation on a unit sphere (step 315). However, as previously noted, the surface normals may be represented on any mathematical representation of any sphere.

Figure 3B:
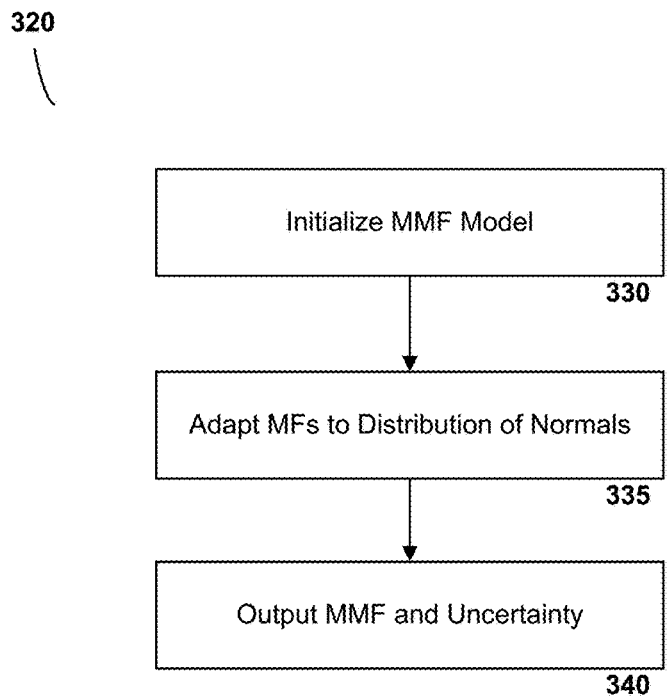

Once the surface normals have been extracted, they may be used to identify a set of orientations that explain the positioning of the surface normals on the sphere (step 320). This may be performed by, for example, an orientation agent, such as the orientation agent 206 of FIG. 2. FIG. 3B depicts a flow diagram further defining step 320 of the method 300. In one embodiment, step 320 may comprise initializing an MMF model, such as the MMF model 122 of FIG. 1 (step 330). The model 122 may be used to adapt the MFs within the model to explain the positioning of observed normals (step 335). For example, parameters of the MMF model 122 may be updated iteratively until convergence or another suitable end point is reached. Finally, a set of Manhattan Frames expressing the dominant orientations in a scene is output from the model 122, which may include a corresponding estimate of uncertainty (step 340).

Further, once a set of orientations has been identified, additional surface normals may be assigned to each orientation (step 325). This may be useful, for example, when using a coarse-to-fine approach. In this approach, a random subset of the surface normals may be used to identify the orientations for a scene. Once the orientations have been found, the remaining un-assigned surface normals may be assigned to the correct orientation. This may be useful, for example, to improve processing time of the method 300. Similarly, as will be described in further detail below, it may be advantageous to remove surface normals that have a low probability of being associated with a particular orientation.

Figure 4A:
FIGS. 4A-C depict an RGB image, a representation of a scene derived from a depth image, and a unit sphere having points representing surface normals from the representation of the scene, respectively.
Figure 4B:
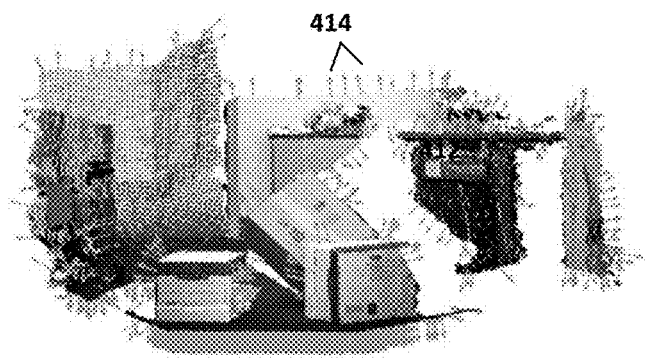
Figure 4C:
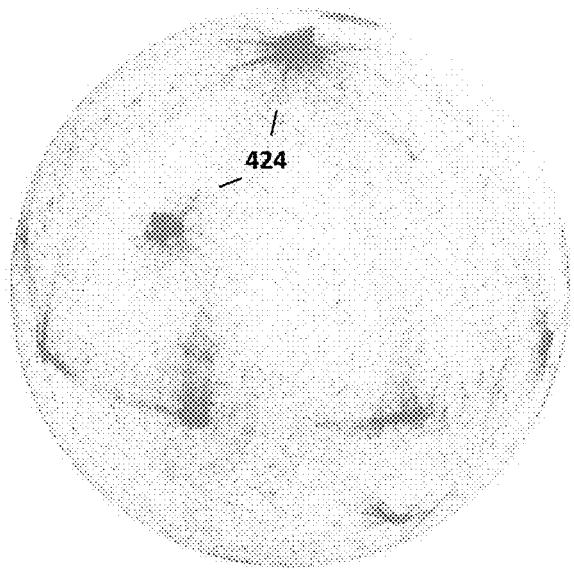

An MMF model 122 according to the disclosure may rely on a structured and concentrated pattern of surface normals generated from a scene. Accordingly, an accurate and robust estimation of normals helps to optimize the model. FIG. 4 provides a visual illustration of the extraction of a set of surface normals 414 from a scene 412 (i.e., step 310 of FIG. 3). The scene 412 may be a three dimensional representation generated from a depth image, which may comprise an RGB image 402 showing three boxes in various orientations. As shown, the surface normals 414 comprise vectors orthogonal to the planes and surfaces within the scene 412. Extraction of surface normals from a scene may further comprise representing the surface normals 414 on a unit sphere, assuming that the surface normals are all of the same (e.g., unit) length. While in this embodiment, surface normals are extracted from a scene, in certain embodiments according to the disclosure various forms of directional data or information may be extracted from a scene in order to facilitate the identification of a set of orientations.

As shown in this embodiment, the image 402 and scene 412 depict several cardboard boxes in a room comprising several orientations. An orientation reflects the rotation of a set of planes within the scene, and identifies the positioning of objects within a scene with respect to an orthogonal coordinate system. Accordingly, a visual inspection of the scene 412 identifies three orientations: one orientation corresponding to each box. Accordingly, a strict Manhattan World assumption does not hold for the scene 412 because each of the cardboard boxes is in a different orientation. While parts of the scene can be modeled as a Manhattan World, the entire scene cannot. However, the scene 412 may instead be modeled as a Mixture of Manhattan Frames (MMF), wherein each Manhattan Frame (MF) defines a Manhattan World of a specific orientation.

Three-dimensional information within the scene 412 may be used to extract the set of surface normals. Surface normals may be extracted using a variety of methods. For example, raw normals may be extracted from the scene 412 as $$q(u, v) = \frac{X_u \times X_v}{\|X_u \times X_v\|},$$

wherein $X_u$ and $X_v$ (computed using forward finite-differences) are the derivatives of an observed 3D surface patch with respect to its local parameterization as implied by the image coordinate system used. More information on normal extraction may be found in Holz et. al., "Real-Time Plane Segmentation using RGB-D Cameras", *Proceedings of the Robocup Symposium*, 2011.

Surface normals may further be represented as points 424 lying on a mathematical representation of the sphere 422. Assuming each surface normal is centered at the origin of a sphere, each point 424 represents the position at which the surface normal would intersect with the surface of the sphere following its directional vector. As will be described in further detail below, representing normals as points lying on a unit sphere may be used by an MMF model according to the disclosure to identify a plurality of Manhattan Frames within the scene 412.

Normals may be further processed to improve operation of the MMF model 122 and MF Extraction engine 124. For example, as depth images may be subject to noise, a normal map may be regularized in a way that preserves discontinuities to avoid artifacts at the edges of objects within the scene. This may be done by total-variation (TV) regularization of the normal field, for example, as specified in Rosman et al., "Fast regularization of matrix-valued images", *ECCV*, vol. 7574, pp. 173-186, 2012. The total-variation of a normal map from the image domain into a matrix manifold (in our case, the unit sphere) may be minimized using a fast augmented-Lagrangian scheme. As shown, the resulting scene 412 and points 424 lying on the sphere 422 have a concentrated distribution of surface normals.

Figure 5A:
FIGS. 5A-C depict scenes derived from a depth image, Kintinuous data, and LiDAR measurements, respectively, and corresponding surface normals on unit spheres for each scene.
Figure 5A:
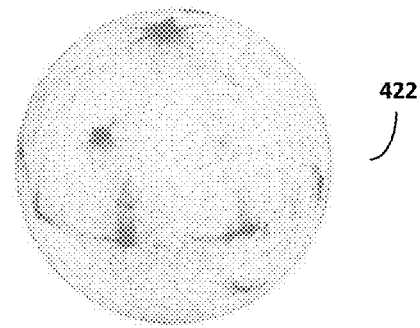
Figure 5B:
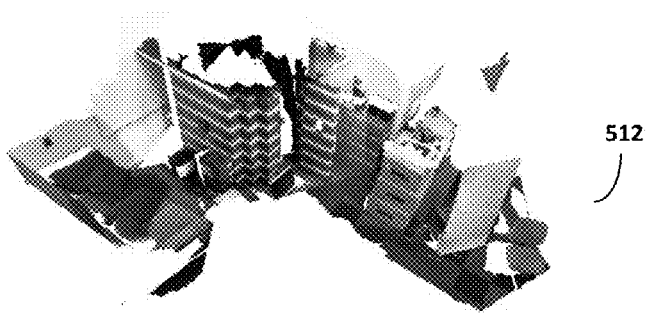
Figure 5B:
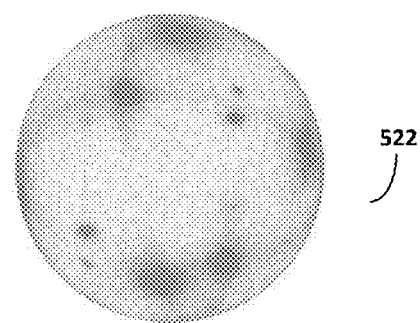
Figure 5C:
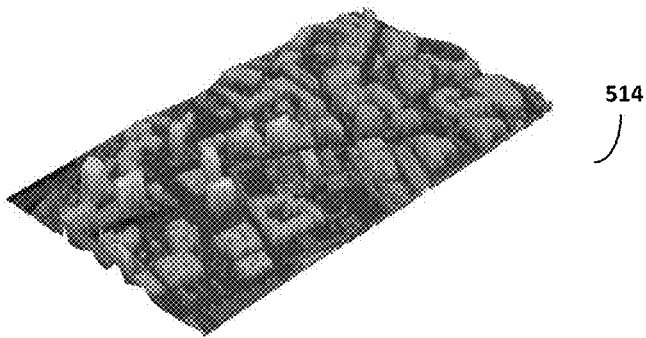
Figure 5C:
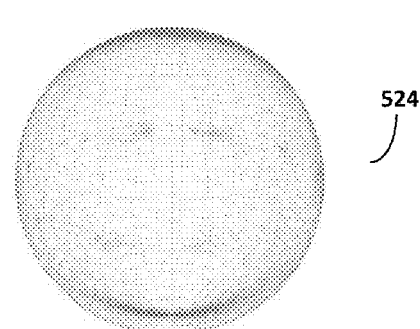

As previously noted, while this embodiment describes the use of depth images, various sources may be used to provide surface normals. For example, LIDAR data, point cloud data, and the like may also be used to generate surface normals and a normal map according to the disclosure. As shown in FIGS. 5A-C, normal maps on unit spheres 422, 522, 524 may be generated from scenes created using various sources, such as depth images (e.g., the scene 412);

Kintinuous data, which is generated from an algorithm that fuses a stream of depth images into a larger, dense point cloud (e.g., scene 512); and even aerial LiDAR measurements of a city (e.g., scene 514). Accordingly, any source of scene data that may be used to generate directional vectors or surface normals may be utilized by embodiments of the disclosure. Further, embodiments of the disclosure may be used for scenes ranging from small sizes, such as a room, to larger urban landscapes.

Further, surface normals may be processed differently depending on their source. For example, LiDAR measurements are typically noisy and unevenly sampled. In these embodiments, a variant of robust moving-least-squares normal estimation may be used (e.g., as in Fleishman et. al., "Robust moving least-squares fitting with sharp features", *SIGGRAPH*, pp. 544-552, 2005). A local plane may be estimated using Random Sample Consensus (RANSAC), based on a preset width that defines outliers of the plane model. The normal votes are averaged for each point from neighboring estimates based on a Gaussian weight with respect to the Euclidean distance from the estimator. To improve operation of the MMF model, only votes whose estimation have sufficient support in the RANSAC computation may be included in the nearby point set.

II. Mixture of Manhattan Frames Framework

An embodiment of a Mixture of Manhattan Frames (MMF) framework, including embodiments for identifying a set of orientations within a scene that explain the positioning of surface normals on a sphere (step 320 of FIG. 3), is described below. As previously noted, this may be performed by initializing a MMF model, adapting MFs within the model to the positioning of the surface normals by iterating over the parameters in the MMF model, and outputting a set of MFs and corresponding uncertainty (steps 330, 335, 340 of FIG. 3).

First, an embodiment of a mathematical representation of the MMF model is described. Next, an embodiment of a probabilistic model for the MMF is described, along with an embodiment of a statistical-inference scheme for the model. It should be noted that while the described approach is probabilistic, the mathematical representation of the MMF model may still be used within a deterministic approach. Similarly, though a specific probabilistic model as well as an effective inference method are described below, one may adopt alternative probabilistic models and/or inference schemes for implementing an orientation extraction system according to the disclosure.

A. Mathematical Representation

Figure 6:
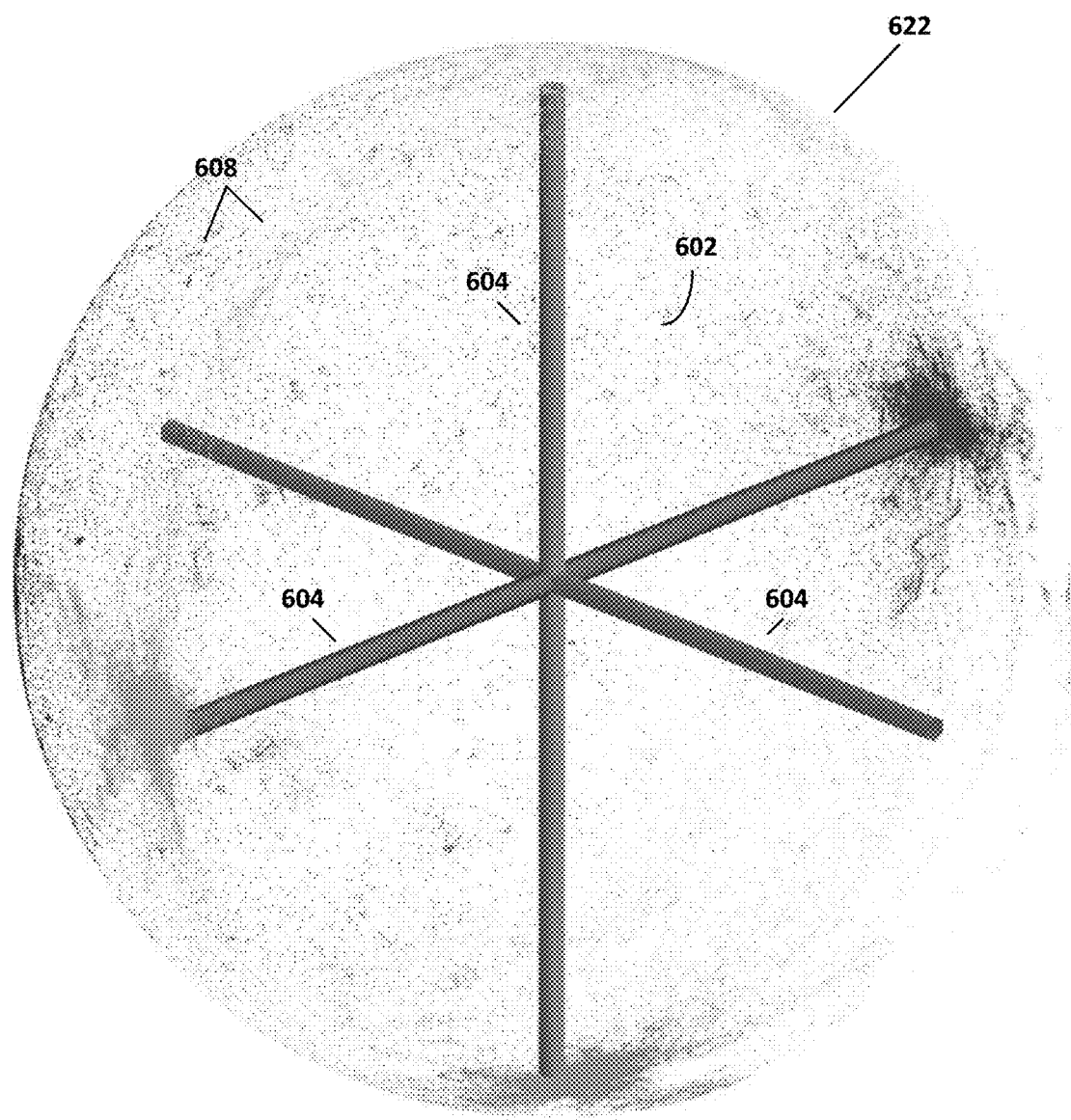

FIG. 6 illustrates a single Manhattan Frame 602 within a unit sphere 622. While this embodiment refers to a unit sphere, as previously noted, a sphere having any radius may be used. As noted above, a scene may be represented or described as a mixture or combination of several Manhattan Frames. Manhattan Frames may be identified by exploiting the geometry of the unit sphere, which is a 2-dimensional Riemannian manifold whose geometry is well understood. Let R be a 3D rotation matrix, R∈SO(3), which by construction defines an orthogonal coordinate system of $\mathbb{R}^3$. The Manhattan Frame M associated with R may be defined as the six unit-length 3D vectors which coincide, up to a sign (i.e., +/−), with one of the columns of R. In other words, M is the set of all planes that are parallel to one of the three major planes of $\mathbb{R}^3$. M may be written as a 3-by-6 matrix: M= [R, −R], where the j-th column $[M]_j$ of M may be regarded as a signed axis, wherein j∈{1, . . . , 6}. As shown in FIG. 6, the Manhattan Frame 602 has axes 604 corresponding to j directions.

If a 3D scene consists of only planar surfaces, such that the set of their surface normals is contained in the set $\{[M]_j\}_{j=1}^6$, then the single Manhattan Frame M captures all possible orientations in the scene. Accordingly, a scene having only a single Manhattan Frame obeys the Manhattan World assumption, because there is only one orientation. However, scenes having multiple orientations may be represented as a plurality or Mixture of Manhattan Frames. In the Mixture of Manhattan Frame (MMF) representation as described herein, scenes may comprise K Manhattan Frames, $\{M_1 \ldots M_K\}$, which jointly define 6K signed axes. As previously noted, for K=1, the model coincides with the Manhattan World.

The MMF representation aims to describe the positioning of surface normals on a unit sphere. Typically, surface normals from measurements such as depth images or LIDAR data are noisy. As such, it is useful to think of a Manhattan Frame as the set of surface normals that are aligned with one of the 6 orthogonal directions parameterized by R and −R, as shown in FIG. 6. In practice, as is common in many 3D processing pipelines (e.g., in surface fairing or reconstruction), observed surface normals may be estimated from noisy measurements, such as depth images, LIDAR data, and the like. The surface normals are mapped to a unit sphere (such as the unit sphere 606) having geometry $S^2$ in the orthogonal coordinate system $\mathbb{R}^3$. The unit sphere is a two-dimensional manifold with a geometry $S^2$ that is well understood.

Surface normals (here, represented as points 608 lying on the unit sphere 606) may be assigned to individual Manhattan Frames. Let $q_i \in S^2$ denote the ith observed surface normal. Each surface normal $q_i$ may have two levels of association with a particular Manhattan Frame. The first, $c_i \in \{1, \ldots, K\}$ assigns $q_i$ to a specific Manhattan Frame of K Manhattan Frames. The second level of association, $z_i \in \{1, \ldots, 6\}$, assigns $q_i$ to a specific signed axis within the Manhattan Frame $M_{c_i}$. Let $[M_{c_i}]_{z_i}$ denote the $z_i$-th column of $M_{c_i}$. In other words, $[M_{c_i}]_{z_i}$ is the signed axis associated with $q_i$.

In real observed data, the positioning of $q_i$ on the unit sphere may deviate from the associated signed axis $z_i$. This implies that the angle between these two unit vectors, $q_i$ and $[M_{c_i}]_{z_i}$, may not be zero. These deviations may be used to determine the correct number and rotations of each Manhattan Frame within an MMF model, and the correct assignment of normals. As will be described in further detail below, it is convenient to model these deviates not on $S^2$ (the unit sphere in $\mathbb{R}^3$) directly, but rather in a tangent plane. To further explain these concepts, some differential-geometric notions will now be described.

Figure 7:
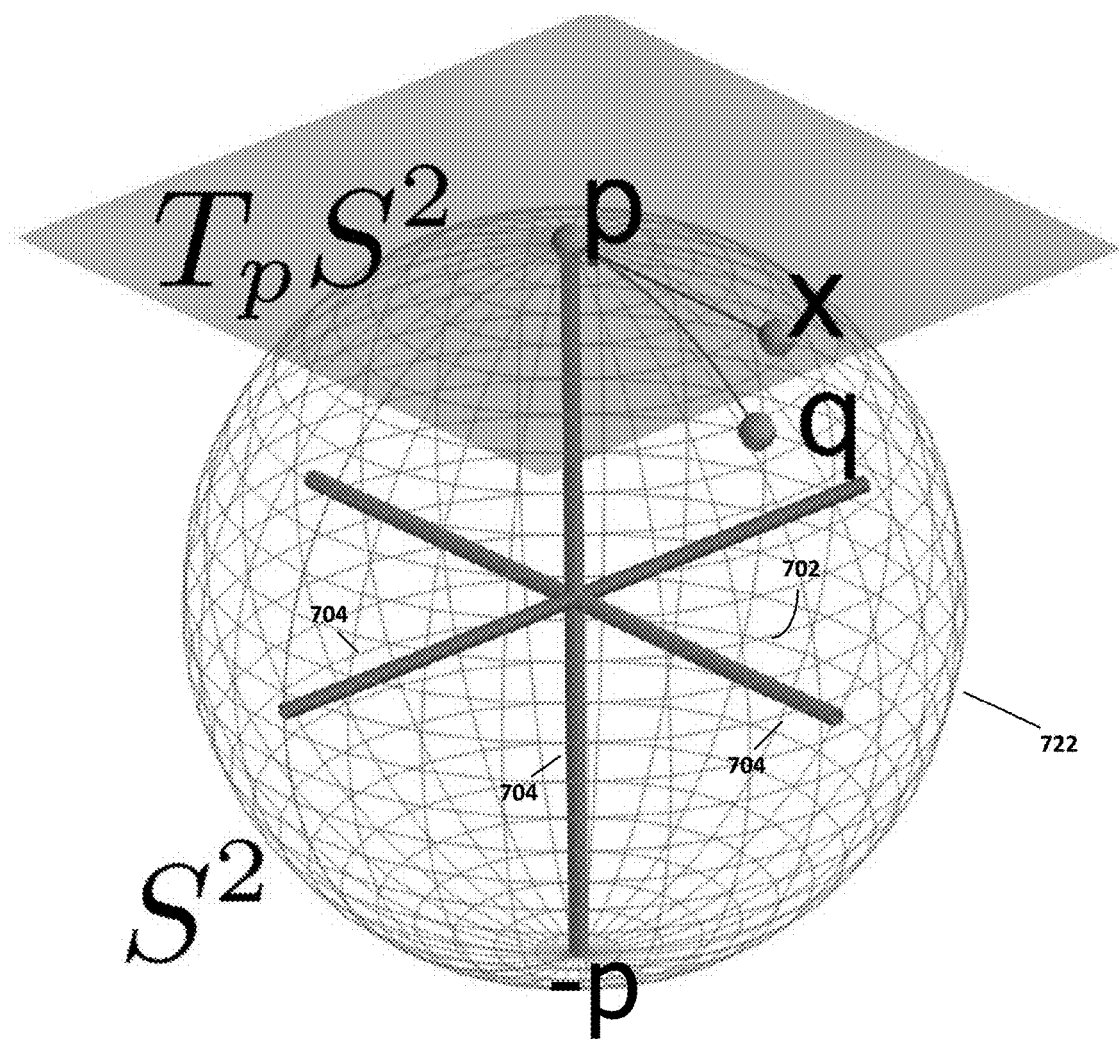

FIG. 7 illustrates a unit sphere 722 with a single Manhattan Frame 702. As shown, the Manhattan Frame 702 has axes 704, with one axis intersecting the unit sphere 722 at a point p in $S^2$. Let $T_p S^2$ denote the tangent space to $S^2$ at point p; namely, $$T_p S^2 = \{x : x \in \mathbb{R}^3; x^T p = 0\}. \qquad (1)$$

As shown in FIG. 7, while $S^2$ is a non-linear manifold, $T_p S^2$ is a 2-dimensional linear space. As will be described in further detail below, this linear representation of $S^2$ helps to simplify probabilistic modeling and statistical inference. The Riemannian logarithm (with respect to the point of the tangency p), $Log_p : S^2\{-p\} \to T_p S^2$, enables the mapping of points on the unit sphere 722 (other than the antipodal point, −p) to the tangent space $T_p S^2$. To map points from the tangent space $T_p S^2$ back to the unit sphere in $S^2$, the Riemannian exponential map, $\mathrm{Exp}_p: T_pS^2 \to S^2$, may be used. Note that these two maps depend on the point of tangency, p.

Let q be a second point in $S^2$. For example, q may be a single surface normal assigned to the Manhattan Frame having an axis aligned at the point p. If p and q are two points in $S^2$, then the geodesic distance between p and q is simply defined to be the angle between them: $d_G(p,q) = \arccos(p^T q)$. It can be shown that $d_G(p,q) = \|\mathrm{Log}_p(q)\|$. (See Do Carmo, *Riemannian Geometry*, Birkhauser, 1992.) Returning now to the issue of the angular deviation of $q_i$ from $[M_{c_i}]_{z_i}$ (the signed axis of a Manhattan Frame M associated with $q_i$), as long as $q_i$ and $[M_{c_i}]_{z_i}$ are not antipodal points, their deviation can be computed as $$d_G([M_{c_i}]_{z_i}, q_i) = \left\| \mathrm{Log}_{[M_{c_i}]_{z_i}}(q_i) \right\|.$$

This deviation may be modeled as a tangent vector x on the tangent plane $T_p S^2$, which may be mapped back to $q \in S^2$ via $\mathrm{Exp}_p$.

Accordingly, given N observed normals, $\{q_i\}_{i=1}^N$, the parameters of a Mixture of Manhattan Frames (MMF) model 122 may be: K, the number of Manhattan Frames; $\{M_k\}_{k=1}^K$, the rotation of each of the K Manhattan Frames; $\{c_i\}_{i=1}^N$, the assignments of each of the N normals to a particular Manhattan Frame; and $\{z_i\}_{i=1}^N$, the assignments of each of the N normals to a particular axis of the associated Manhattan Frame. In order to fit these parameters, one would seek to penalize surface normals deviating from their assigned axes, $$\left\{ \left\| \mathrm{Log}_{[M_{c_i}]_{z_i}}(q_i) \right\| \right\}_{i=1}^N.$$

These parameters may be formulated using a variety of approaches, including deterministic and probabilistic approaches. As will be described below, this embodiment of the disclosure adopts a probabilistic approach.

Moreover, while this embodiment models the deviation as a tangent vector on the tangent plane, other approaches may be used. For example, the deviation may also be modeled as distances directly on the surface of the sphere, or by ignoring the geometry of the sphere and measuring the distances directly in the ambient space (in $\mathbb{R}^3$).

B. Probabilistic Model

As described above, embodiments of the disclosure may characterize scene representations as multiple intermediate representations, such as MMFs, to facilitate higher level reasoning. As such, adopting a probabilistic model allows one to incorporate prior knowledge in a principled way, model inherent measurement noise, and derive tractable inference, because conditional independence facilitates drawing samples in parallel.

Figure 8:
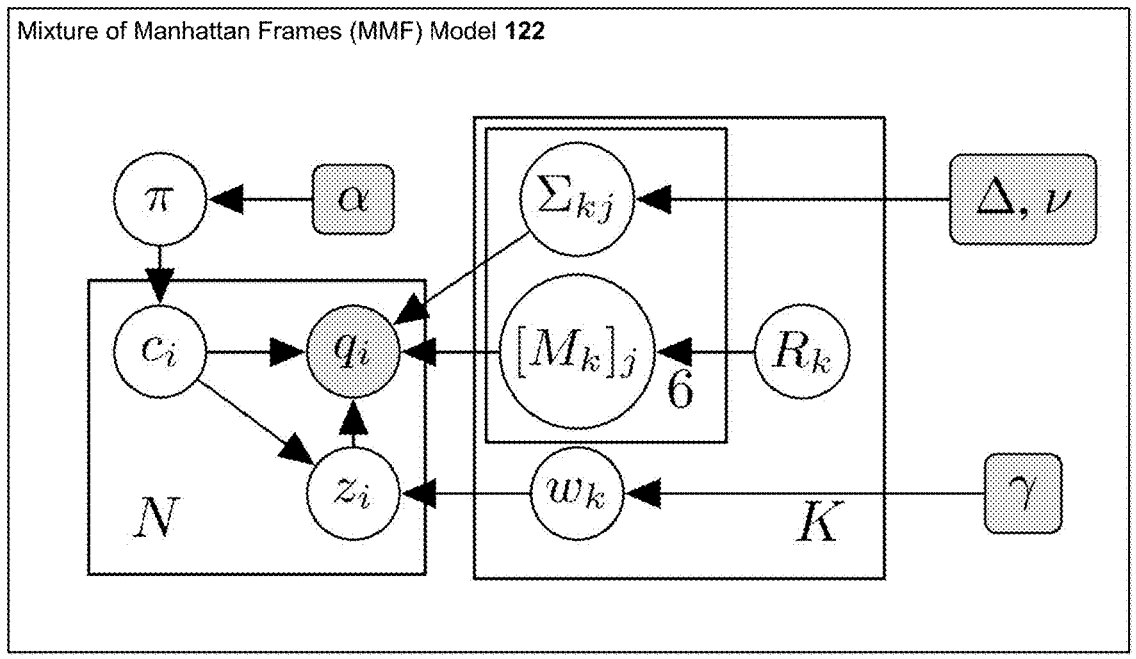

FIG. 8 illustrates a graphical representation of an embodiment of the MMF model 122 of FIG. 2 for identifying a plurality or Mixture of Manhattan Frames from a scene. In this embodiment, the MMF model 122 is a Bayesian finite mixture model that considers the geometries of both the unit sphere $S^2$ and the 3D rotation group SO(3). In this embodiment, the parameters of the MMF model 122 are regarded as random variables. The MMF model 122 may be used by an orientation agent (such as the orientation agent 206 of FIG. 2) to estimate rotation matrices $R_k$ of a plurality of Manhattan frames $M_k$, wherein $k \in \{1 \ldots K\}$. As noted above, each Manhattan frame $M_k$ has j axes, wherein $j \in \{1 \ldots 6\}$.

A description of an MMF model according to the disclosure, such as the MMF model 122 of FIG. 1, follows. The MMF model 122 may be used to identify the parameters of a plurality of Manhattan Frames that best explain the observations of surface normals on a sphere. In this embodiment, assignments of each normal $q_i$ to a Manhattan frame $M_k$ are represented by the parameter $c_i$. The parameter $c_i$ may be assumed to be distributed according to a categorical distribution $\pi$ with a Dirichlet distribution prior parameterized by a hyper-parameter $\alpha$, a vector of positive real numbers:

$$c_i \sim \mathrm{Cat}(\pi); \pi \sim \mathrm{Dir}(\alpha). \tag{2}$$

Let $R_k \in SO(3)$ denote the rotation associated with a particular Manhattan frame $M_k$. Making no assumptions about which orientation of $M_k$ is more likely than others, $R_k$ may be distributed uniformly:

$$R_k \sim \mathrm{Unif}(SO(3)). \tag{3}$$

Assignments of each normal $q_i$ to a particular axis of its associated Manhattan frame $M_k$ may be represented by the parameter $z_i$. At this second level of association, the $z_i$'s may be assumed to be distributed according to a categorical distribution $w_{c_i}$, with a Dirichlet distribution prior parameterized by a hyper-parameter $\gamma$, also a vector of positive real numbers:

$$z_i \sim \mathrm{Cat}(w_{c_i}); w_{c_i} \sim \mathrm{Dir}(\gamma). \tag{4}$$

Deviations of observed normals $q_i$ from their associated signed axis $z_i$ may be modeled by a two-dimensional zero-mean Gaussian distribution in the tangent space to that axis:

$$p(q_i; [M_{c_i}]_{z_i}, \Sigma_{c_i z_i}) = N\left( \mathrm{Log}_{[M_{c_i}]_{z_i}}(q_i); 0, \Sigma_{c_i z_i} \right), \tag{5}$$

wherein $$\mathrm{Log}_{[M_{c_i}]_{z_i}}(q_i) \in T_{[M_{c_i}]_{z_i}} S^2.$$

In other words, the probability density function (p.d.f.) of $q_i \in S^2$ can be evaluated by first mapping $q_i$ into the tangent space $$T_{[M_{c_i}]_{z_i}} S^2,$$

and then evaluating $q_i$ under the Gaussian distribution with covariance $\Sigma_{c_i z_i} \in \mathbb{R}^{2 \times 2}$. The p.d.f. of the normals over the nonlinear unit sphere $S^2$ may then be induced by the Riemannian exponential map:

$$q_i \sim \mathrm{Exp}_{[M_{c_i}]_{z_i}}(N(0, \Sigma_{c_i z_i})); \Sigma_{c_i z_i} \sim IW(\Delta, v). \tag{6}$$

Note that the range of $\mathrm{Log}_p$ is contained within a disk of finite radius ($\pi$), while the Gaussian distribution has infinite support. Consequently, an inverse Wishart (IW) prior may be used that favors small covariances, thus resulting in a probability distribution that, except a negligible fraction, is within the range of $\text{Log}_p$ and concentrated about the respective axis $z_i$. The parameter $v \in \mathbb{R}$ is a pseudo-counts parameter which may be set to a high value, e.g., in the order of N/6. The parameter $\Delta \in \mathbb{R}^{(D-1) \times (D-1)}$ may be set to a diagonal matrix having entries $(v-D-1)T^2$, where T is the angle that, on average, signifies one standard deviation of the sampled covariance matrix $\Sigma$.

The hyper-parameters $\alpha$ and $\gamma$ may be chosen in a variety of ways. In one embodiment, $\alpha$ may be set to $\alpha<1$ to favor models having only a few Manhattan Frames, as expected for scenes reflecting man-made or influenced structures. To encourage the association of equal numbers of normals to all of the axes of each Manhattan Frame, a strong prior (i.e., $\gamma \gg 1$) may be placed on the distribution of axis assignments $z_i$. Intuitively, this initial selection of $\alpha$ and $\gamma$ corresponds to a desire to have each Manhattan Frame explain the positioning of several directions of surface normals on the unit sphere, as opposed to a single direction. However, in certain embodiments, these parameters may be initialized differently to better accommodate different types of scenes.

C. Statistical Inference

Once the MMF model 122 has been initialized (step 330 of FIG. 3), the parameters of the model may be inferred using statistical inference. In this embodiment, the parameters of the MMF model 122 are estimated using Bayesian inference. This may be performed by an orientation agent, such as the orientation agent 206 of FIG. 2. In this embodiment, the orientation agent 206 may estimate the parameters of the MMF model 122 using a combination of Gibbs sampling and Metropolis-Hastings split/merge proposals. Specifically, an orientation agent 206 employing a Gibbs sampler samples over the latent assignment variables $c=\{c_i\}_{i=1}^N$ and $z=\{z_i\}_{i=1}^N$, their categorical distribution parameters $\pi$ and $w=\{w_k\}_{k=1}^K$, as well as the covariances in the tangent spaces around the MF axes $\Sigma=\{\{\Sigma_{kj}\}_{j=1}^6\}_{k=1}^K$ and the MF rotations $R=\{R_k\}_{k=1}^K$. Below, the posterior distributions which may be used for Gibbs sampling are explained, and an algorithm for inference is then outlined.

i. Posterior Distributions for MCMC Sampling

The posterior distributions of both mixture weights are:

$$p(\pi|c;\alpha)=\text{Dir}(\alpha_1+N_1, \ldots, \alpha_K+N_K) \quad (7)$$

$$p(w_k|c,z;\gamma)=\text{Dir}(\gamma_1+N_{k1}, \ldots, \gamma_6+N_{k6}) \quad (8)$$

where $N_k=\Sigma_{i=1}^N \mathbb{1}_{[c_i=k]}$ is the number of surface normals assigned to the kth MF and $N_{kj}=\Sigma_{i=1}^N \mathbb{1}_{[c_i=k]} \mathbb{1}_{[z_i=j]}$ is the number of surface normals assigned to the jth axis of the kth MF. The indicator function $\mathbb{1}_{[a=b]}$ is 1 if a=b, and 0 otherwise.

Evaluating the likelihood of $q_i$ as described in Eqn. (5), the posterior distributions for the association labels $c_i$ and $z_i$ are given as:

$$p(c_i=k|\pi,q_i,\Theta) \propto \pi_k \Sigma_{j=1}^6 w_{kj} p(q_i;[M_k]_j,\Sigma_{kj}) \quad (9)$$

$$p(z_i=j|c_i,q_i,\Theta) \propto w_{c_ij} p(q_i;[M_{c_i}]_j,\Sigma_{c_ij}) \quad (10)$$

where $\Theta=\{w,\Sigma,R\}$. Let $x_i$ represent the mapping of $q_i$ from the unit sphere to the tangent space $$T_{[M_{c_i}]_{z_i}}S^2.$$

$x_i$ may be computed as $$x_i = \text{Log}_{[M_{c_i}]_{z_i}}(q_i)$$

to obtain a scatter matrix $S_{kj}=\Sigma_i^N \mathbb{1}_{[c_i=k]} \mathbb{1}_{[z_i=j]} x_i x_i^T$ in the tangent space $$T_{[M_k]_j}S^2.$$

Using $S_{kj}$, the posterior distribution over covariances $\Sigma_{kj}$ is:

$$p(\Sigma_{kj}|c,z,q,R;\Delta,v)=IW(\Delta+S_{kj},v+N_{kj}) \quad (11)$$

There is no closed-form posterior distribution for an MF rotation given axis-associated normals. However, this may be approximated as a narrow Gaussian distribution on the rotation group SO(3) around an optimal rotation $R^*_k$ under normal assignments z and c:

$$p(R_k|z,c,q) \approx N(R_k;R^*_k(R_k^0,z,c,q),\Sigma_{SO(3)}), \quad (12)$$

where $\Sigma_{SO(3)} \in \mathbb{R}^{3 \times 3}$ and $R_k^0$ is set to $R_k$ from the previous Gibbs iteration.

Now that the posterior distributions have been defined, an optimization procedure that yields a (locally-) optimal rotation $R^*_k \in SO(3)$ of MF $M_k$ given a set of $N_k$ assigned normals $q=\{q_i\}_{i:c_i=k}$ and their associations $z_i$ to one of the six axes $[M_k]_{z_i}$ may be formulated. This may yield an optimal rotation as $R^*_k=\arg\min_{R_k} F(R_k)$, where a cost function, $F:SO(3) \to \mathbb{R}_+$, penalizes the geodesic deviation of a normal from its associated MF axis:

$$F(R_k) = \frac{1}{N_k} \sum_{i:c_i=k} \rho(d_G(q_i, [M_k]_{z_i})). \quad (13)$$

Additional robustness against noise and model outliers may be achieved by replacing the non-robust $\rho:x \mapsto x^2$ with a Geman-McClure robust function $\rho_{GMC}:x \mapsto x^2/x^2+\sigma^2$.

Note that the cost function F is defined over SO(3), a nonlinear space. In order to ensure that not only the minimizer will be in SO(3) but also that the geometry of the space will be fully exploited, it is important to use appropriate tools from optimization over manifolds. For example, one may use a conjugate-gradient algorithm, e.g. as described in Edelman et. al., "The geometry of algorithms with orthogonality constraints", *SIMAX*, 20(2):303-353, 1998. This algorithm may successfully minimize the cost function F and converge in a minimal number of iterations.

ii. Metropolis-Hastings MCMC Sampling

Figure 9:
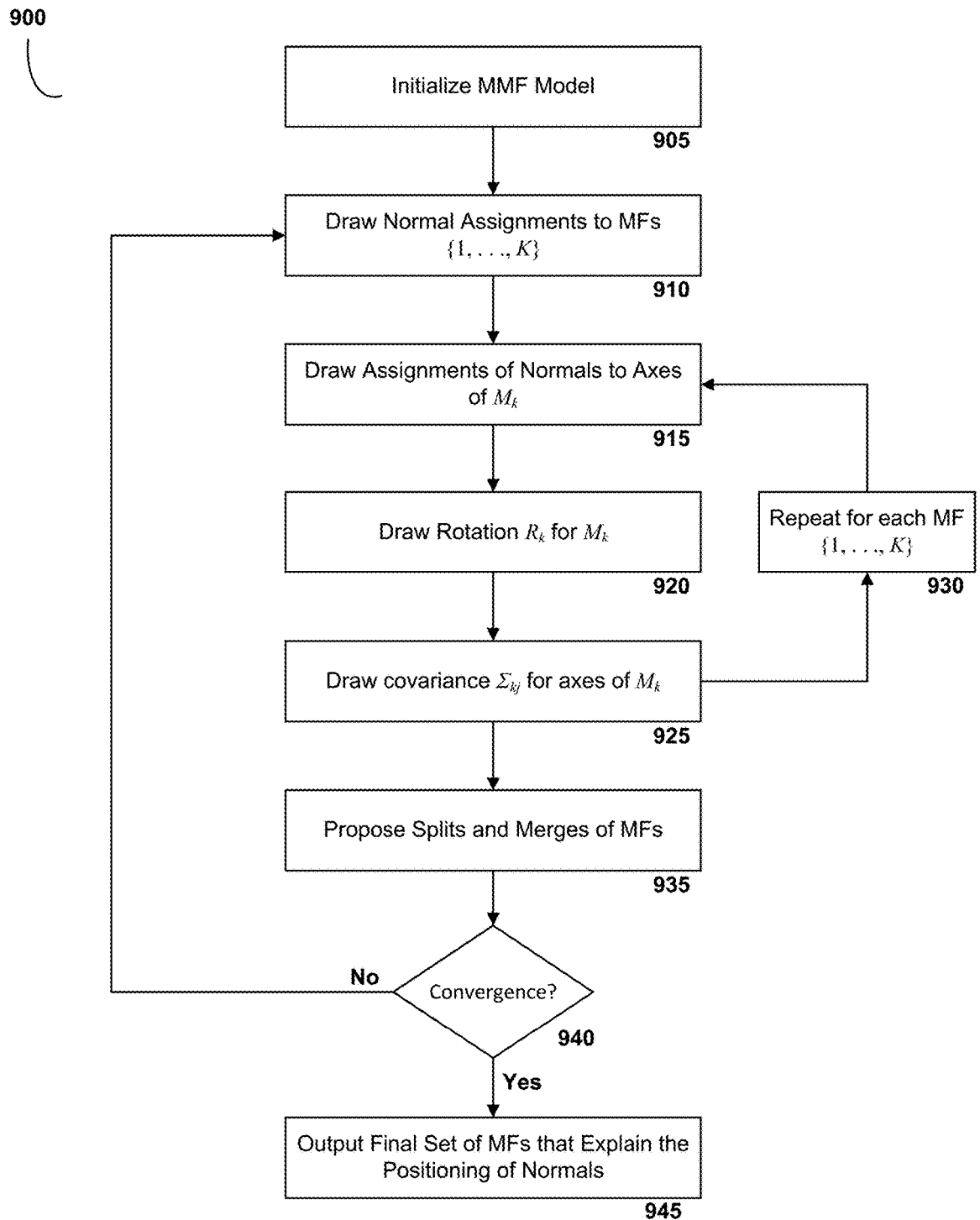

Inferring the parameters in the MMF model 122 (e.g., as part of step 335 of FIG. 3) may be performed using a variety of approaches, including Gibbs sampling. Gibbs sampling is a Markov Chain Monte Carlo (MCMC) algorithm for obtaining an estimate of the parameters of a probabilistic model, such as the MMF model 122 of FIG. 1. FIG. 9 illustrates an embodiment of a method 900 for inferring the parameters of the model 122 using a Gibbs sampling algorithm with Metropolis-Hastings split/merge proposals. For K MFs and N surface normals the computational complexity per iterations is $O(K^2N)$. To let the order of the model (i.e., the number of MFs K) adapt to the complexity of the distribution of normals on the unit sphere, Metropolis-Hastings-based split/merge proposals may also be implemented. In this way, in each iteration the number of MFs may be adjusted to better match the observed normals on the unit sphere.

The method 900 may begin by first initializing the MMF model 122 (step 905). An arbitrary number of MFs K may be provided (e.g., between 3 and 6 to suit many man-made scenes) and a random rotation is generated for each MF. Next, parameters $\pi$, $c_i$ associated with the assignment of normals to MFs are initially sampled from their posterior distributions ($p(\pi|c; \alpha)$, Eqn. 7; $p(c_i|\pi, q_i, \Theta)$, Eqn. 9) (step 910). Once the normals have been assigned to respective Manhattan Frames, the normals are assigned to an axis by sampling the parameters $w_k, z_i$ from their respective posterior distributions ($p(w_k|c,z; \gamma)$, Eqn. 8; $p(z_i|c_i,q_i,\Theta)$, Eqn. 10) (step 915). Once the parameters associated with the normals N have been sampled, the method continues by sampling posterior estimates for the rotation $R_k$ and covariance $\{\Sigma_{kj}\}_{j=1}^{6}$ of each Manhattan Frame (steps 920, 925).

Once all posterior parameters associated with the N normals and K MFs have been sampled (step 930), the method 900 continues by proposing splits and merges for the Manhattan frames K (step 935). On a high level, a proposed merge of MFs $M_k$ and $M_l$ comprises the following steps. First, all normals of $M_l$ are assigned to $M_k$ to obtain a new MF, $\hat{M}_k$. $M_l$ is removed from the set K, and the axis assignments $\hat{z}_i$ of the normals in $\hat{M}_k$ are resampled. The rotation $R_k$ is sampled, and the axis covariance $\{\Sigma_{kj}\}_{j=1}^{6}$ is sampled under the new rotation. A proposed split of a Manhattan frame $M_k$ into two new Manhattan frames $\hat{M}_l$ and $\hat{M}_m$ comprises sampling associations $\hat{c}_i$ to MFs $\hat{M}_l$ and $\hat{M}_m$ for all normals previously assigned to $M_k$. Axis assignments $\hat{z}_i$ are then sampled for $\hat{M}_l$ and $\hat{M}_m$. Conditioned on the new assignments, new rotations and axis covariances are then sampled.

Once the splits and merges have been proposed, an acceptance probability for each is generated. The acceptance probability may be generated using a generalization of the Metropolis-Hastings algorithm, Reverse Jump Markov Chain Monte Carlo (RJMCMC). The RJMCMC algorithm provides a way of computing an acceptance probability for a move when the number of parameters changes between moves. A proposed split or merge move is accepted randomly according to the previously computed acceptance probability. This means that even if the acceptance probability is high, the split or merge may be rejected with some low probability. This way of accepting splits and merges of the Manhattan Frames ensures detailed balance of the Markov Chain. Therefore, the samples from the Markov Chain may be guaranteed to be samples from the true posterior distribution in the limit as additional samples are drawn. In practice, typically only a few sampler iterations are sufficient to converge to a mode of the MMF distribution. For additional details on splits and merges, see Straub et. al., "A Mixture of Manhattan Frames: Beyond the Manhattan World," *IEEE Conference on Computer Vision and Pattern Recognition (CVPR)* 2014, pp. 3770-3777, the contents of which are hereby incorporated by reference.

The method 900 may be repeated until convergence, or another suitable end-point, has been reached (decision 940). Once the parameters of the model have been inferred, a final set of MFs explaining the positioning of the set of normal N may be output from the model (step 945).

D. Other Approaches for the MMF

In addition to the above, various other approaches may be used for inferring the parameters of the MMF model. For example, by using a discretization (tessellation) of the unit sphere, maxima of the surface normal distribution may be extracted. The Random Sample Consensus (RANSAC) algorithm may then be used to fit MFs to the expected maxima until all maxima are assigned to an axis of an MV via the assignment labels $c_i$ and $z_i$. Accordingly, such an approach would not require the MMF model 122, only the mathematical representation as described above.

In another embodiment, maximum a posteriori inference can be used to infer the parameters of the MMF model 122. Instead of sampling the labels $c_i$ and $z_i$, covariances, and rotations from their posterior distributions, the most probable value (e.g., the mode, or an appropriate quantile) under the respective posterior distributions is simply assigned as the estimate. In this case, changing the number of MFs can be done in a similar approach as described above. However, an easier method would be to simply assume a large number of MFs. After inference of the MMF model, not all of the initially instantiated MFs will have surface normals associated with them, and may be removed. Therefore, the inferred number of MFs is the number of MFs that have associated surface normals.

In another embodiment, low-variance asymptotic analysis can be used to obtain k-means-like fast inference algorithms from the MMF model 122. K-means-like algorithms are fast algorithms that iterate between assigning labels (i.e., the assignment of normals to MFs and axes) and updating the centroid of the model given the labels (i.e., the MF rotations).

III. Results

A. MMF Inference from Depth Images

We now display the results of the application of the above MMF model to various depth images, including the depth image used to create the scene 412 of FIG. 4. In these examples, an MMF for a scene was inferred using a coarse-to-fine approach. First, the set of normals for a scene was down sampled to 120,000. The MMF model was then initialized and repeated for T=80 iterations, proposing splits and merges at each iteration as previously described. The final MMF was then used to sample labels for the full set of normals. In these examples, the following parameters were used for the inference of MMFs in all depth images: $\Sigma_{SO(3)} = (2.5°)^2 I_{3\times3}$ and $\sigma=15°$. The hyper-parameters for the MMF were set to $\alpha=0.01$, $\gamma=120$, $\nu=12$ k, and $\Delta=(15°)^2 \nu I_{2\times2}$. It should be noted that these parameters are only exemplary, and may be varied to accommodate different scenes or images.

Figure 10:
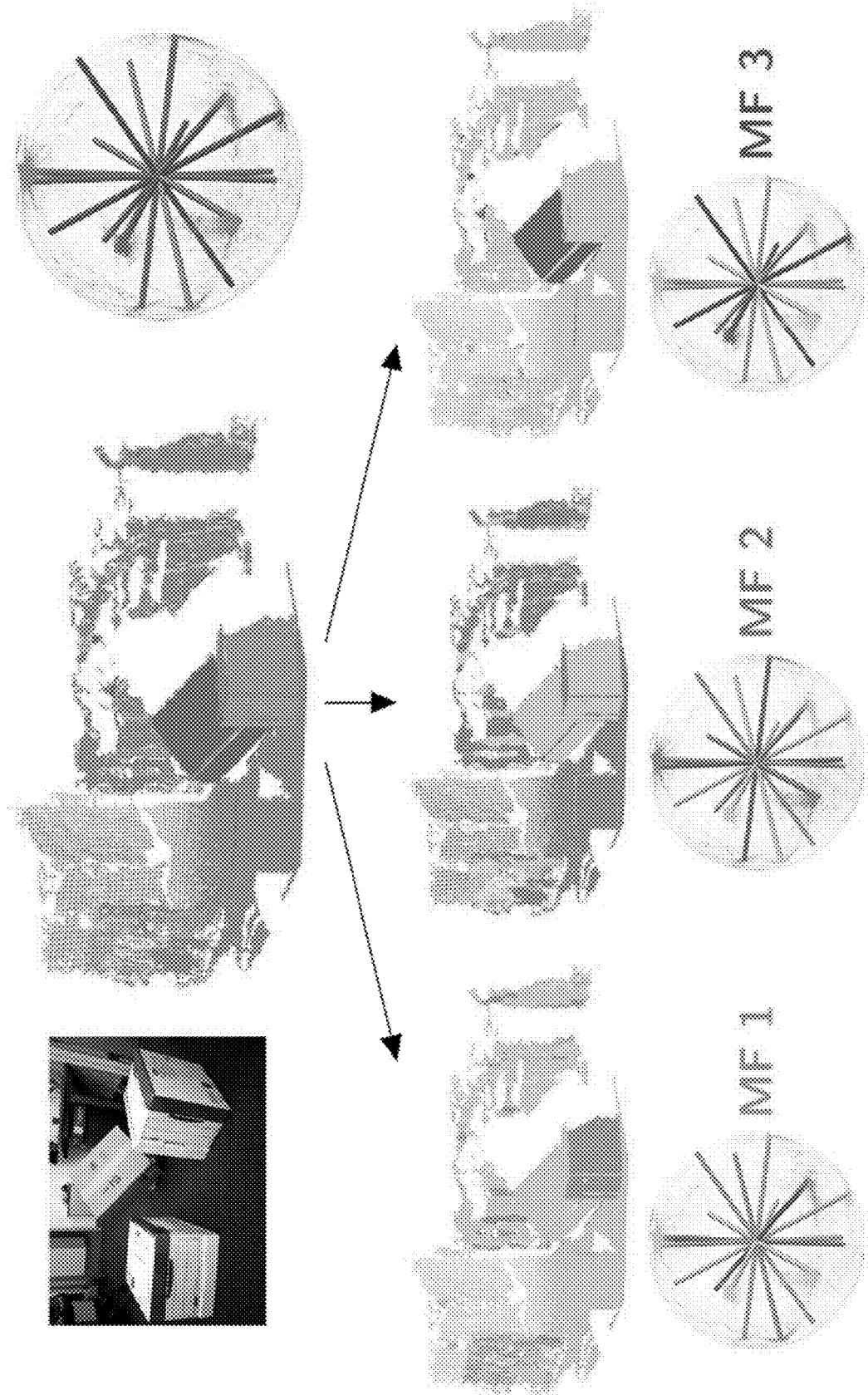

FIG. 10 illustrates the MMF resulting from the scene 412 of FIG. 3, showing three boxes having different orientations. For this scene, the number of MFs in the MMF model 122 was initialized to K=6. The algorithm correctly infers the true number of MFs to be K=3, as shown on the unit sphere and point cloud in FIG. 10. The three extracted MFs correspond to the three differently rotated boxes in the depth image. While the blue MF consists only of the single box standing on one corner, the green and red MFs contain planes of the surrounding room in addition to their respective boxes. This highlights the ability of the MMF model to pool normal measurements from an entire scene. On a Core i7 laptop, this inference takes an un-optimized single thread Python implementation about 9 minutes on average. This could be sped up significantly by proposing splits and merges less frequently, or by employing a sub-cluster approach for splits and merges (e.g., as introduced by Chang and Fisher, "Parallel Sampling of DP mixture models using sub-clusters splits", *NIPS*, 2013).

Figure 11:

FIG. 11 depicts a table 1102 illustrating the performance of the MMF algorithm on various scenes from the NYU V2 dataset (Silberman et al., "Indoor segmentation and support inference from RGBD images," *ECCV*, 2012), which contains 1449 RGB-D images of various indoor scenes. FIG. 11 is a table depicting several typical indoor scenes of varying complexity. Row (1) illustrates RGB images of various indoor scenes of columns (a) through (f). Row (2) illustrates an inferred MMF model for each indoor scene. For the single MF scenes in rows (a) and (b), the assignment to MF axes is color coded; brighter colors designate opposing axes.

For the scenes from rows (c) to (f), the assignments to MFs are depicted in orange, blue, and pink. Areas without depth information are depicted in black. Row (3) depicts the log-likelihood values of the normals assigned to each inferred MF by colors, with the corresponding color shown in the color bar at right. Row (4) depicts the results of plane segmentation for each of the scenes.

For each scene, the number of MFs the algorithm inferred was compared to the number of MFs perceived by a human annotator. It was found that in 80% (for initial K=3 MFs) and 81% (for initial K=6 MFs) of the scenes, the algorithm converged to the hand-labeled number of MFs. Qualitatively, the inferred MF orientations were consistent with the human-perceived layout of the scenes.

Cases where in the inference converged to the wrong number of MFs may involve poor depth measurements due to reflections, strong ambient light, black surfaces, or range limitations of the sensor. However, it is noted that the inference converged to the wrong number of MFs mainly because of nearby round objects, or significant clutter within the scene. These latter failure cases violate the Manhattan assumption, and are hence to be expected. However, in these cases the MMF fails gracefully by approximating round objects with several MFs, or adding a "noise MF" to capture clutter. Accordingly, to eliminate these "noise MFs", one can consider only MFs holding more than 15% of all normals. Over all scenes, the algorithm converged to the same number of MFs in 90% of the scenes when initialized to K=3 MFs and K=6 MFs. For these scenes the hand labeled number of MFs was correctly inferred in 84% of the cases. These statistics show that the inference algorithm can handle a wide variety of indoor scenes and is not sensitive to the initial number of MFs.

As noted above, FIG. 11 is a table depicting several typical indoor scenes of varying complexity in row (1), and the resulting inferred MFs in row (2). The inference algorithm was started with K=6 MFs in these cases. For the scenes in columns (a) and (b), the inference yielded a single MF each. For these scenes, the assignment to MF axes are displayed in red, green and blue, where opposite MF axes are distinguished by a weaker tone of the respective color. The algorithm infers K=2 MFs for the scenes in (c)-(f), and K=3 MFs for the scene in (g). For those scenes the assignment of normals to the different MFs is displayed in orange, blue and pink. The gray color stems from a mixture of blue and orange which occurs if MFs share an axis direction.

Given the inferred MMF parameters, the log-likelihood of a normal can be evaluated using Eqn. (5). The log-likelihood for each normal is displayed in the row (3) of FIG. 11. As shown, planar surfaces have a high probability (i.e., are depicted in black), whereas corners, round objects, and noisy portions of the scene have a low probability (i.e., are depicted in yellow) under the inferred model. The log-likelihood values of the normals may be used, for example, to remove noisy measurements to improve subsequent processing.

B. MMF Inference from LIDAR Data

Figure 12A:
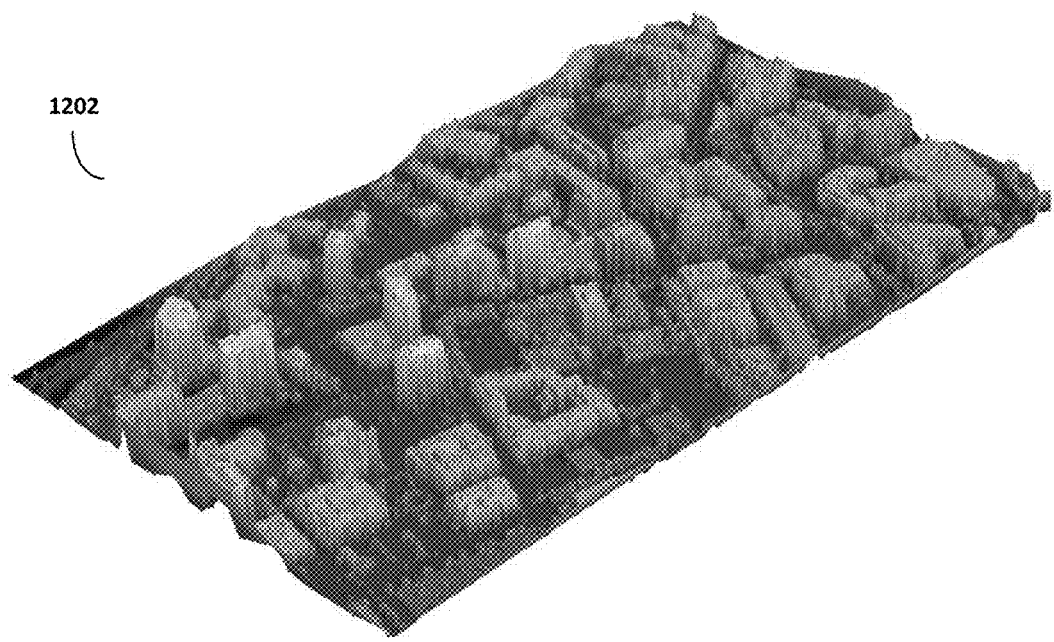
FIGS. 12A-B illustrate LiDAR measurements of a city center, and a representation of a map of the city center with surface normal assigned to different Manhattan Frames highlighted using a different color (Red, Green, Blue)

FIG. 12A illustrates the results of the application of the MMF model to a large-scale LiDAR scan 1202 of a part of Cambridge, Mass., USA. The point cloud generated from the scan has few measurements associated with the sides of buildings due to reflections of the glass facades. Additionally, the point cloud does not have homogenous density due to overlapping scan-paths of the airplane which performed the LiDAR scan. This explains the varying density of the points. The LiDAR scans were subsequently processed as described above to handle noisy and unevenly sampled data (i.e., using a variant of robust moving-least-squares normal estimation).

Figure 12B:

FIG. 12B shows the point cloud of the LiDAR scan 1202 colored according to MF assignment of the surface normals 1206 on top of a gray street-map 1204. (In this figure, the surface normals associated with upward-pointing MF axes are removed to avoid clutter.) Interestingly, the inferred MFs have clear directions associated with them: blue is in the direction of Boston, green is in the direction of Harvard, and red is aligned with the Charles River waterfront. Accordingly, the MMF algorithm may be used to generate high-level understandings of large man-made structures. The fact that the inference converges to this MMF demonstrates the descriptive power of the MMF model to capture both small and large-scale organizational structure in man-made environments.

IV. Applications

In addition to identifying the set of dominant orientations of a scene, the MFs inferred using embodiments of the disclosure may be utilized for various purposes.

A. Depth Camera Calibration

As described above, the MMF model provides associations of normals to MF axes which are assumed to be orthogonal to one another. This can be further exploited to find the focal length f of a depth camera, because $q_i$ is influenced by f through the computation of the normals $q_i$ as expressed (above) and the inverse relationship between a point $(x,y,z)^T$ in 3D and a point $(u,v)^T$ in the image:

$$\begin{pmatrix} x \\ y \end{pmatrix} = \frac{z}{f} \begin{pmatrix} u - u_c \\ v - v_c \end{pmatrix},$$

where $(u_c, v_c)^T$ is the image center.

This process, however, is nonlinear and does not have a closed-form solution for its derivative with respect to f. Therefore, we may resort to gradient-based optimization methods or an exhaustive search to find the minimum of the cost function F defined by Eqn. (13) where we fix the MMF, but introduce a dependency on f.

$$F(f) = \frac{1}{N} \sum_{i=1}^{N} \rho(d_G(q_i(f), [M_{c_i}]_{z_i})). \quad (14)$$

Figure 13A:
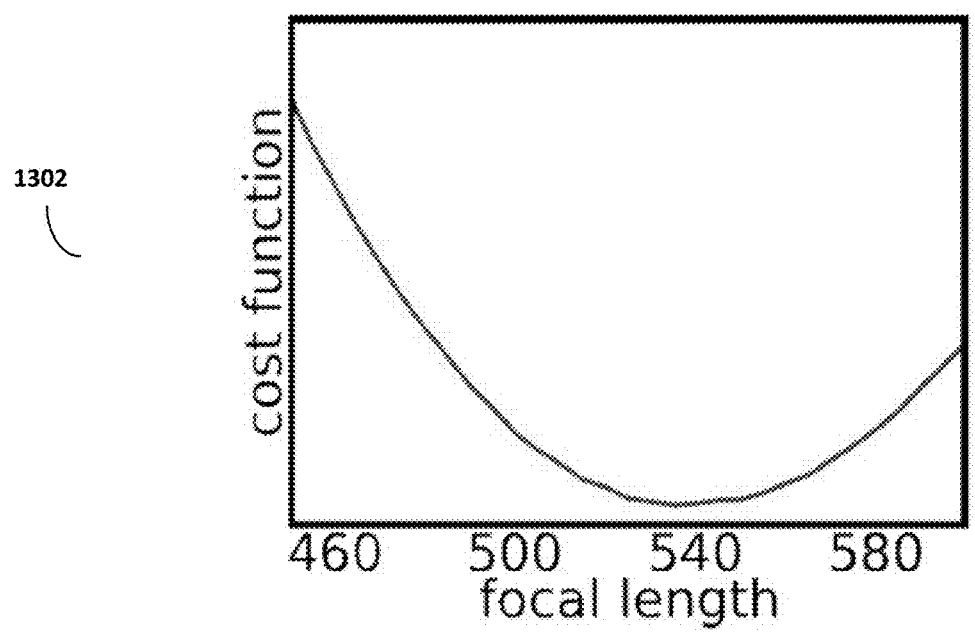
FIGS. 13A-B illustrate graphs illustrating the application of the MMF model to calibration of depth cameras.
Figure 13B:
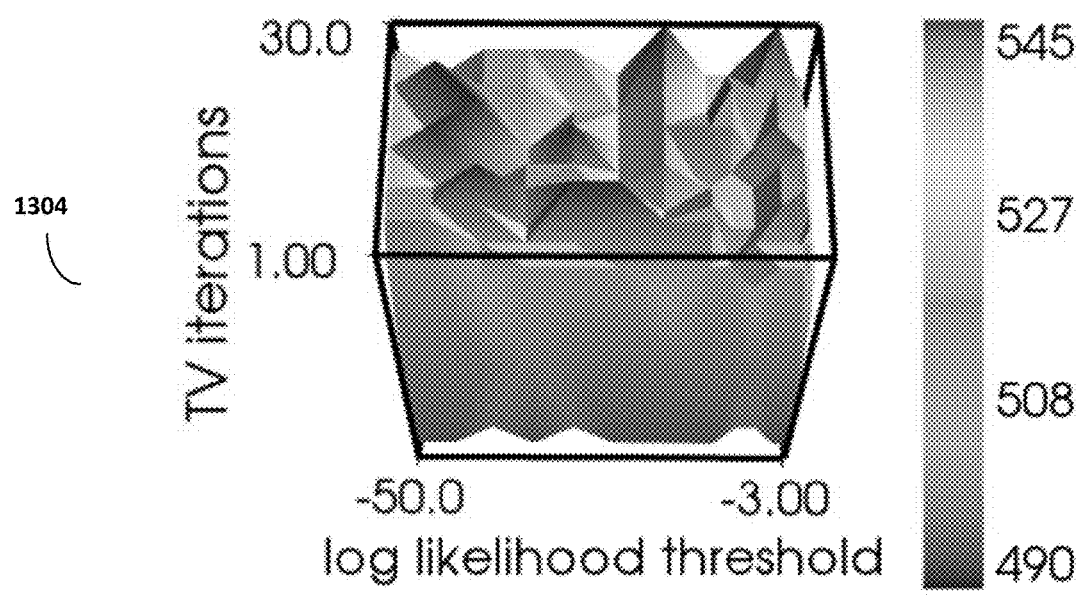

FIG. 13A illustrates a graph 1302 of the cost function F(f) for a specific MMF, and FIG. 13B illustrates a graph 1304 of the estimated focal length as a function of the number of total-variation (TV) smoothing iterations and the log-likelihood threshold for normal selection. As shown in FIGS. 13A-B, given a reasonable initialization of f (e.g., the factory calibration), f can be determined uniquely, without any minima.

The typical angular deviation of about 4° in corners of point clouds vanishes after calibrating the focal length using this method. For example, the calibration algorithm determines the focal length of an ASUS Xtion PRO depth camera to be f=540 px, whereas the factory calibration is f=570.3 px.

While this can be viewed as the first step of an alternating minimization of both f and the MMF parameters, in practice, a single update of f usually suffices. In this way, the MMF model provides a way of calibrating a depth scanner from a single depth image of any scene exhibiting structure that can be modeled by the MMF. In contrast to other approaches, which may use standard monocular camera techniques or joint calibration of RGB and an RGB-D sensor, this calibration procedure is simpler because it only relies on depth images from a scene following the MMF assumption, and no special calibration pattern or calibration object needs to be created. Furthermore, there appear to be no conventional calibration schemes for depth sensors that exploit even the Manhattan World assumption.

B. Plane Segmentation

As described above, for a given scene, the MMF approximates the orientations of all planes within the scene. Normals of different planes with the same orientation contribute to the same MF axis. However, to segment the planes, the planes may be separated by their offset in space along the respective MF axis. First, low-likelihood normals (i.e., those normals that do not have a strong association with an MF and its associated axis) are removed. Next, MF axes pointing in the same direction (such as the normals near the floor of the scene 404 of FIG. 4B) are combined.

Plane segmentation may be performed as follows. First, all 3D points associated with a certain MF axis via their respective surface normal are projected onto their respective MF axis. The axis is then discretized into segments, e.g., of 3 cm length. For each of the segments, the number of 3D points are counted. The counts for each segment may be referred to as buckets. Buckets under a certain threshold $n_{bin}$ are removed. Next, the number of 3D points in consecutive buckets are collected into sets which constitute planes. Only planes have more than $n_{plane}$ normals are kept.

We find that thresholds of $n_{bin}=100$, $n_{plane}=1000$, and a bin size of 3 cm to work well across various scenes. However, these values may be varied. FIG. 11, row (4), illustrates the results of plane segmentation using this approach for several indoor scenes. It should be noted that even though the MMF model does not utilize spatial regularity, it is able to be used to perform dense plane segmentation.

C. Regularization of 3D Reconstructions

After the MMF has been inferred, individual MFs may be used to regularize 3D reconstructions of a scene. As illustrated by the spheres shown in FIGS. 4-6, typically surface normals extracted from a scene are not entirely aligned with their associated MF axis. Accordingly, the resulting reconstruction may be noisy at the locations of the surface normals that deviate from their associated MF axis. Because the MMF algorithm robustly infers the directions of the MF axes, the surfaces within the scene may be transformed such that all surface normals point exactly into the direction of their associated MF axis. This can be useful, for example, in the reconstructions of interiors of buildings, or of city environments.

D. Applications in Robotics and Navigation

Robotics can also profit from the inferred MMF of a scene. The MMF can inform robots by telling them which areas are traversable, or could contain objects that the robot is potentially looking for. For example, this can be performed by identifying areas having surface normals that point in the same or opposite directions of gravity. If such an area is at a floor level, the area may be considered to be traversable; however, if it is above or below, it is probably not directly reachable. However, this area could still contain objects that the robot may be searching for. All of the other directions of the MMF may be understood to designate surfaces that a robot should try to avoid navigating into.

The Atlanta World (AW) and Manhattan World (MW) assumptions have similarly been used as navigation aids for robotics. However, these assumptions are not flexible enough to allow operation in more complex environments. The MMF provides autonomous robotic agents with the ability to navigate these environments. Further, the MMF provides richer information to robotic navigation than point clouds and plane-based representations. The MMF identifies relationships between orthogonal planes, as opposed to a set of planes which are independent.

Accordingly, a description of various systems and methods for identifying a plurality of orientations within a scene has been provided. Further, it should be noted that various features of the above embodiments and disclosure may be combined with one another to form various orientation identifying and extraction systems. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of identifying dominant orientations from a scene, comprising:
   representing, by an orientation agent executing on a processor, a scene as a plurality of directional vectors, wherein the plurality of directional vectors comprise a plurality of surface normals;
   determining, based on the plurality of surface normals, a plurality of orientations describing the scene;
   wherein the determined plurality of orientations explains the directionality of the plurality of surface normals;
   representing the plurality of surface normals as points lying on a mathematical representation of a sphere; and
   adapting the plurality of orientations to explain the positioning of the surface normals lying on the mathematical representation of the sphere,
   wherein adapting the plurality of orientations comprises initializing a statistical model describing the positioning of the surface normals lying on the mathematical representation of the sphere, and describing the plurality of orientations; and
   wherein determining the plurality of orientations comprises inferring the parameters of the statistical model, wherein inferring the parameters of the statistical model comprises:
   determining the rotation of each orientation within the mathematical representation of the sphere; and
   assigning the plurality of surface normals to an axis of an orientation.

2. The method of claim 1, wherein the plurality of orientations have independent axes of rotation relative to one another.

3. The method of claim 1, wherein the scene comprises a three-dimensional representation of a scene.

4. The method of claim 1, wherein the plurality of orientations comprise a set of orthogonally coupled axes which explain the directionality of the plurality of directional vectors.

5. The method of claim 1, further comprising:
receiving a representation of a scene; and
extracting the plurality of surface normals from the representation of the scene.

6. The method of claim 1, wherein the sphere is a unit sphere.

7. The method of claim 1, wherein determining a plurality of orientations comprises determining a plurality of orientations that explains the positioning of the plurality of surface normals lying on the mathematical representation of the sphere.

8. The method of claim 1, wherein the statistical model is a Bayesian model.

9. The method of claim 1, wherein the statistical model is a deterministic model.

10. The method of claim 1, wherein inferring the parameters of the statistical model further comprises mapping each normal of the plurality of normals to a plane tangent to an associated axis of an associated orientation to the normal.

11. The method of claim 10, further comprising determining whether the normal belongs to the associated axis of the associated orientation based on its position on the tangent plane.

12. The method of claim 10, wherein each surface normal is modeled on the tangent space as a Gaussian distribution.

13. The method of claim 12, further comprising optimizing the rotation of an orientation based on the position of a plurality of associated normals on the tangent plane.

14. The method of claim 5, wherein the scene is selected from the group consisting of a depth image, stereo vision, a virtual scene, and LiDAR measurements.

15. A system for identifying a dominant set of orientations for a scene, comprising:
a representation of a three-dimensional scene;
a mathematical representation of a sphere;
a statistical model comprising parameters for a plurality of surface normals and a plurality of orientations; and
an orientation agent executing on a processor and configured to:
receive the representation of the scene;
extract a plurality of surface normals from the representation of the scene;
represent the plurality of surface normals as points lying on the mathematical representation of a sphere; and
determine a plurality of orientations that explain the positioning of surface normals on the mathematical representation of a sphere by inferring the parameters of the statistical model, wherein inferring the parameters of the statistical model comprises:
determining the rotation of each orientation within the mathematical representation of the sphere; and
assigning the plurality of surface normals to an axis of an orientation.

16. The system of claim 15, wherein inferring the parameters of the statistical model further comprises mapping each normal of the plurality of normals to a plane tangent to an associated axis of an associated orientation to the normal.

17. The system of claim 16, wherein the orientation agent is further configured to determine whether the normal belongs to the associated axis of the associated orientation based on its position on the tangent plane.

18. The system of claim 16, wherein each surface normal is modeled on the tangent space as a Gaussian distribution.

19. The system of claim 16, wherein the orientation agent is further configured to optimize the rotation of an orientation based on the position of a plurality of associated normals on the tangent plane.

* * * * *